(12) United States Patent
Moshal

(10) Patent No.: US 10,528,935 B2
(45) Date of Patent: Jan. 7, 2020

(54) PAYMENT SYSTEM AND METHOD

(71) Applicant: GELLINER LIMITED, Douglas (GB)

(72) Inventor: Martin Paul Moshal, Queens Way Quay (GI)

(73) Assignee: Gelliner Limited, Douglas (IM)

( * ) Notice: Subject to any disclaimer, the term of this patent is extended or adjusted under 35 U.S.C. 154(b) by 169 days.

(21) Appl. No.: 14/356,552

(22) PCT Filed: Nov. 12, 2012

(86) PCT No.: PCT/GB2012/052805
§ 371 (c)(1),
(2) Date: May 6, 2014

(87) PCT Pub. No.: WO2013/068768
PCT Pub. Date: May 16, 2013

(65) Prior Publication Data
US 2015/0178757 A1    Jun. 25, 2015

Related U.S. Application Data

(60) Provisional application No. 61/587,416, filed on Jan. 17, 2012.

(30) Foreign Application Priority Data

Nov. 10, 2011 (GB) .................................. 1119375.2

(51) Int. Cl.
*G06Q 20/20* (2012.01)
*G06Q 20/14* (2012.01)
(Continued)

(52) U.S. Cl.
CPC ....... *G06Q 20/208* (2013.01); *G06F 16/9554* (2019.01); *G06K 7/1417* (2013.01);
(Continued)

(58) Field of Classification Search
CPC ............. G06Q 20/145; G06Q 20/3829; G06Q 30/0609; G06Q 30/0185; G06Q 30/0225;
(Continued)

(56) References Cited

U.S. PATENT DOCUMENTS 6,108,656 A    8/2000   Durst et al.
6,144,959 A    11/2000  Anderson et al.
(Continued)

FOREIGN PATENT DOCUMENTS

CN    1598881 A     3/2005
EP    1195973 A1    4/2002
(Continued)

OTHER PUBLICATIONS

"Button Control with Workflow-Supporting Activity Functionality" Siemens Jurgen Carstens, Pub. Date: May 5, 2011.*
(Continued)

*Primary Examiner* — Victoria E Frunzi
(74) *Attorney, Agent, or Firm* — McDonnell Boehnen Hulbert & Berghoff LLP

(57) ABSTRACT

A smartphone (106) with a processor (150) can execute program instructions to cause currency transfers transactions to be made to accounts associated with other smartphones and to interact with an application server (102) or merchant terminal (108). The smartphone can scan a quick response (QR) code and decode the QR code to recover encoded data. The smartphone can use the encoded data, alone or with other data, such as data from a user profile, to obtain promotional vouchers from the merchant server. The smart phone can initiate redemption of the promotional vouchers. The smartphone can display a validation form to prompt capturing images of items an application server can use to validate payment instruments and accounts. The validation form may prompt a user to capture images of a driver's
(Continued)

license, a payment instrument, an invoice, or a passport. Smartphone communication with the application server can include device identifier such as MSISDN, IMEI, or IMSI.

19 Claims, 12 Drawing Sheets

(51) Int. Cl.

| | |
|---|---|
| G06F 16/955 | (2019.01) |
| G06Q 20/22 | (2012.01) |
| G06Q 20/40 | (2012.01) |
| G06Q 20/42 | (2012.01) |
| G06Q 30/06 | (2012.01) |
| G06Q 20/10 | (2012.01) |
| G06Q 20/12 | (2012.01) |
| G06K 7/14 | (2006.01) |
| G06Q 30/00 | (2012.01) |
| H04L 9/08 | (2006.01) |
| H04L 29/06 | (2006.01) |
| G06K 19/06 | (2006.01) |
| G06Q 20/32 | (2012.01) |
| G06Q 30/02 | (2012.01) |
| G06Q 20/38 | (2012.01) |
| G06Q 20/36 | (2012.01) |

(52) U.S. Cl.
CPC ..... *G06K 19/06037* (2013.01); *G06Q 20/102* (2013.01); *G06Q 20/12* (2013.01); *G06Q 20/14* (2013.01); *G06Q 20/145* (2013.01); *G06Q 20/223* (2013.01); *G06Q 20/322* (2013.01); *G06Q 20/3255* (2013.01); *G06Q 20/3276* (2013.01); *G06Q 20/387* (2013.01); *G06Q 20/3829* (2013.01); *G06Q 20/40* (2013.01); *G06Q 20/4014* (2013.01); *G06Q 20/425* (2013.01); *G06Q 30/0185* (2013.01); *G06Q 30/02* (2013.01); *G06Q 30/0225* (2013.01); *G06Q 30/06* (2013.01); *G06Q 30/0609* (2013.01); *G06Q 30/0633* (2013.01); *H04L 9/0819* (2013.01); *H04L 63/083* (2013.01); *G06Q 2220/10* (2013.01)

(58) Field of Classification Search
CPC .... G06Q 30/0633; G06Q 20/40; G06Q 20/12; G06Q 20/208; G06Q 20/102; G06Q 30/02; H04L 9/0819; H04L 63/083; G06K 7/1417
USPC ........................................................ 705/76, 75
See application file for complete search history.

(56) References Cited

U.S. PATENT DOCUMENTS

| | | | |
|---|---|---|---|
| 6,151,426 A * | 11/2000 | Lee ............... | H04N 1/3872 382/319 |
| 6,577,861 B2 | 6/2003 | Ogasawara | |
| 7,080,327 B1 * | 7/2006 | Bartz ............ | G06F 8/34 715/709 |
| 7,083,087 B1 * | 8/2006 | Gangi ........... | G06Q 20/341 235/379 |
| 7,349,884 B1 | 3/2008 | Odom et al. | |
| 7,594,189 B1 | 9/2009 | Walker et al. | |
| 2001/0037297 A1 | 11/2001 | McNair | |
| 2001/0047428 A1 | 11/2001 | Hunter | |
| 2002/0128967 A1 | 9/2002 | Meyer et al. | |
| 2003/0177090 A1 | 9/2003 | Eden | |
| 2004/0235455 A1 | 11/2004 | Jiang | |
| 2005/0033695 A1 | 2/2005 | Minowa | |
| 2005/0060261 A1 | 3/2005 | Remington et al. | |
| 2005/0096011 A1 | 5/2005 | Yoshida et al. | |
| 2005/0211771 A1 | 9/2005 | Onozu | |
| 2005/0269399 A1 | 12/2005 | Bensimon et al. | |
| 2006/0001897 A1 | 1/2006 | Ogasawara | |
| 2006/0026140 A1 | 2/2006 | King et al. | |
| 2006/0047725 A1 | 3/2006 | Bramsom | |
| 2007/0174206 A1 | 7/2007 | Colella | |
| 2007/0299775 A1 | 12/2007 | Algiene | |
| 2007/0300142 A1 | 12/2007 | King et al. | |
| 2008/0002882 A1 | 1/2008 | Voloshynovskyy et al. | |
| 2008/0040265 A1 | 2/2008 | Rackley, III et al. | |
| 2008/0059372 A1 | 3/2008 | Lee et al. | |
| 2008/0189185 A1 | 8/2008 | Matsuo et al. | |
| 2008/0189208 A1 | 8/2008 | Wilkie | |
| 2008/0222048 A1 | 9/2008 | Higgins et al. | |
| 2008/0301444 A1 | 12/2008 | Kim et al. | |
| 2009/0006254 A1 | 1/2009 | Mumm et al. | |
| 2009/0051665 A1 * | 2/2009 | Jang ............. | G06F 3/0482 345/173 |
| 2009/0132381 A1 * | 5/2009 | Gangi ........... | G06K 7/0004 705/18 |
| 2009/0173784 A1 * | 7/2009 | Yang ............ | G06Q 20/042 235/380 |
| 2009/0265231 A1 | 10/2009 | Evanitsky | |
| 2009/0307132 A1 * | 12/2009 | Phillips ........ | G06Q 20/105 705/41 |
| 2009/0319425 A1 | 12/2009 | Tumminaro et al. | |
| 2010/0046811 A1 | 2/2010 | Harris | |
| 2010/0070759 A1 | 3/2010 | Cobos et al. | |
| 2010/0260388 A1 | 10/2010 | Garrett et al. | |
| 2010/0287606 A1 | 11/2010 | Machani | |
| 2010/0320266 A1 | 12/2010 | White | |
| 2011/0089233 A1 | 4/2011 | Locher | |
| 2011/0137742 A1 | 6/2011 | Parikh | |
| 2011/0184843 A1 | 7/2011 | Orttung et al. | |
| 2011/0210922 A1 | 9/2011 | Griffin | |
| 2011/0246070 A1 | 10/2011 | Fitzpatrick et al. | |
| 2011/0251892 A1 | 10/2011 | Laracey | |
| 2011/0251910 A1 | 10/2011 | Dimmick | |
| 2011/0270751 A1 | 11/2011 | Csinger et al. | |
| 2011/0313893 A1 | 12/2011 | Weik, III | |
| 2012/0029997 A1 | 2/2012 | Khan et al. | |
| 2012/0095791 A1 | 4/2012 | Stefik et al. | |
| 2012/0173387 A1 | 7/2012 | Talker | |
| 2012/0221659 A1 | 8/2012 | Brown | |
| 2012/0234906 A1 | 9/2012 | Ganapathi | |
| 2012/0265585 A1 | 10/2012 | Muirbrook et al. | |
| 2012/0284185 A1 * | 11/2012 | Mettler ........ | G06Q 40/02 705/44 |
| 2012/0317156 A1 * | 12/2012 | Tomita ........ | G06F 9/544 707/812 |
| 2013/0073403 A1 | 3/2013 | Tuchman et al. | |
| 2014/0289107 A1 | 9/2014 | Moshal | |
| 2014/0310117 A1 | 10/2014 | Moshal | |
| 2014/0316991 A1 | 10/2014 | Moshal | |
| 2015/0324777 A1 | 11/2015 | Moshal | |
| 2017/0032350 A1 | 2/2017 | Moshal | |

FOREIGN PATENT DOCUMENTS

| | | |
|---|---|---|
| EP | 1587014 A1 | 10/2005 |
| JP | 61-133455 A | 6/1986 |
| JP | 2001319155 A | 11/2001 |
| JP | 2002-207838 A | 7/2002 |
| JP | 2003-6611 A | 1/2003 |
| JP | 2003141689 A | 5/2003 |
| JP | 2004280626 A | 10/2004 |
| JP | 2005-56333 A | 3/2005 |
| JP | 2005100429 A | 4/2005 |
| JP | 2006-18654 A | 1/2006 |
| JP | 2006-186564 A | 7/2006 |
| JP | 2006-251944 A | 9/2006 |
| JP | 2006268446 A | 10/2006 |
| JP | 2007086915 A | 4/2007 |
| JP | 2007-166123 A | 6/2007 |
| JP | 2007-323425 A | 12/2007 |
| JP | 2007-323613 A | 12/2007 |
| JP | 2007-328695 A | 12/2007 |

(56) References Cited

FOREIGN PATENT DOCUMENTS

| | | | |
|---|---|---|---|
| JP | 2008129635 A | 6/2008 |
| JP | 2008-257540 A | 10/2008 |
| JP | 2008-305292 A | 12/2008 |
| JP | 2009-129097 A | 6/2009 |
| JP | 4305847 B2 | 7/2009 |
| JP | 2009-210678 A | 9/2009 |
| JP | 2010-026608 A | 2/2010 |
| JP | 2010128736 A | 6/2010 |
| JP | 2010128736 A1 | 6/2010 |
| JP | 2011210171 A | 10/2011 |
| JP | 2012190308 | 10/2012 |
| KR | 1020030076815 | 9/2003 |
| KR | 1020070055069 | 5/2007 |
| KR | 10-2007-0065958 | 6/2007 |
| KR | 10-2008-0020153 | 3/2008 |
| KR | 1020090066516 | 6/2009 |
| KR | 1020100045586 | 5/2010 |
| KR | 10-2010-0062255 | 6/2010 |
| KR | 1020110006732 | 1/2011 |
| KR | 1020110006734 | 1/2011 |
| KR | 10-2011-0038358 | 4/2011 |
| KR | 10-2011-0066841 | 6/2011 |
| KR | 10-2011-0098247 | 9/2011 |
| KR | 10-2011-0112142 | 10/2011 |
| KR | 102012026221 | 3/2012 |
| KR | 1020120097789 | 9/2012 |
| WO | 9904326 A2 | 1/1999 |
| WO | 00/60484 A1 | 10/2000 |
| WO | 02/080015 A1 | 10/2002 |
| WO | 2005111950 A1 | 11/2005 |
| WO | 2007/018233 A1 | 2/2007 |
| WO | 2011/003467 A1 | 1/2011 |
| WO | 2013068719 A1 | 5/2013 |
| WO | 2013068765 A1 | 5/2013 |
| WO | 2013068767 A1 | 5/2013 |

OTHER PUBLICATIONS

OMA Open Mobile Alliance, White Paper on Mobile Codes, OMA-WP-MobileCodes-20081024-A, Approved Oct. 24, 2008, pp. 1-26.
U.S. Appl. No. 14/682,744, filed Apr. 9, 2015, inventor: Martin Paul Moshal.
U.S. Appl. No. 14/682,660, filed Apr. 9, 2015, inventor: Martin Paul Moshal.
U.S. Appl. No. 14/682,704, filed Apr. 9, 2015, inventor: Martin Paul Moshal.
U.S. Appl. No. 14/682,775, filed Apr. 9, 2015, inventor: Martin Paul Moshal.
European Patent Office, communication pursuant to Article 94(3) EPC, regarding Application No. 12 787 846.0—1995, Jan. 18, 2016, 7 pages.
Jerry Gao et al, "A 2D Barcode-Based Mobile Payment System," Multimedia and Ubiquitous Engineering, 2009, MUE '09 Third International Conference on, IEEE, Piscataway, NJ, USA Jun. 4, 2009, pp. 320-329.
International Searching Authority of European Patent Office, Patent Cooperation Treaty PCT, International Search Report (PCT Article18 and Rules 43 and 44) regarding International Application No. PCT/GB2012/052805, dated Mar. 25, 2013, 8 pages.
International Searching Authority of European Patent Office, Patent Cooperation Treaty PCT Written Opinion of the International Searching Authority regarding International Application No. PCT/GB2012/052805, opinion completion date Mar. 25, 2013, 14 pages.
OMA Open Mobile Alliance, White Paper on Mobile Codes, OMA-WP-MobileCodes-20081024-A, Approved Oct. 24, 2008, 20 pages.
Lee, Jaesik; et al.; Secure Quick Response-Payment (QR-Pay) System using Mobile Device; Advanced Communication Technology (ICACT) 2011 13th International Conference on IEEE, Feb. 13, 2011, 4 pages.
Office Action issued in Japanese Patent Application No. 2014-540556 dated Dec. 7, 2016 (4 pages, plus 3-page English translation).
European Patent Office; Summons to attend oral proceedings pursuant to Rule 115(1)EPC from European Patent Application No. 12787846.0-1217 /2776998; Aug. 3, 2018.
Office Action issued in Korean Patent Application No. 10-2014-7015763 dated Jun. 15, 2018 (5 pages, plus 4-page English translation).
Guide for purchasing smart phone, Windows for adults, Japan, Inforest Co., Ltd., May 1, 2011, vol. 33, p. 32 (with original office action and English translation of office action citing literature).
Notice of Final Rejection for Korean Application No. 10-2014-7015763 dated Jan. 23, 2019, with English translation.
Notice of Preliminary Rejection for Korean Application No. 10-2018-7026670 dated Jan. 21, 2019, with English translation.

* cited by examiner

PAYMENT SYSTEM AND METHOD

PRIORITY CLAIMS

This application claims the benefit of GB Application No. 1119375.2, filed Nov. 10, 2011, and claims the benefit of U.S. Provisional Application No. 61/587,416, filed Jan. 17, 2012. GB Application 1119375.2 and U.S. Provisional Application No. 61/587,416 are incorporated herein by reference for all purposes.

BACKGROUND

Unless otherwise indicated herein, the elements described in this section are not prior art to the claims and are not admitted to be prior art by inclusion in this section.

Settlement of financial transactions between two parties is generally performed by means of cash or various payment instruments such as, for example, debit cards, credit cards, cheques and electronic transfers of funds. Security concerns have lessened the attractiveness of transaction settlement by means of cash, while cheques and electronic transfers are inconvenient to use, as well as time-consuming.

While debit and credit card payments are undoubtedly more convenient to make and/or safer than cash, cheque or electronic transfer payments, it is not uncommon for consumers to carry multiple different credit and debit cards simultaneously, which may become inconvenient as such number of cards increases.

Electronic wallets have become increasingly popular as a means of settling financial transactions. Such electronic wallets are primarily useful for making low-value payments (i.e. micropayments). A further disadvantage of electronic wallets is a lack of widespread acceptance by merchants.

The applicant has appreciated the desirability of a simpler and more efficient process for settling financial transactions than those described above.

OVERVIEW

Example embodiments are described herein. In one respect, an example embodiment takes the form of a method comprising (i) scanning, using a code scanner of a smartphone, a first quick response (QR) code that encodes a first merchant identification code and a first promotion identifier, (ii) decoding the first QR code at the smartphone to recover the first merchant identification code and the first promotion identifier, (iii) transmitting, from the smartphone to an application server, the first merchant identification code and the first promotion identifier recovered from the first QR code, (iv) receiving, at the smartphone from the application server, a first promotion voucher associated with the first promotion identifier, and (v) storing the first promotion voucher at a data storage device of the smartphone.

In another respect, an example embodiment takes the form of a smartphone comprising: (i) a scanner configured to scan a first quick response (QR) that encodes a first merchant identification code and a first promotion identifier, (ii) a processor, (iii) a computer-readable data storage device comprising user profile and computer-readable program instructions, wherein the program instructions are executable to decode the first QR code to recover the first merchant identification code and the first promotion identifier, (iv) a network interface configured to transmit, to an application server, the first merchant identification code and the first promotion identifier recovered from the first QR code. The network interface is configured to receive, from the application server, a first promotion voucher associated with the first promotion identifier. The data storage device stores the first promotion identifier received at the network interface.

In yet another respect, an example embodiment takes the form of a method comprising (i) displaying, on a display device of a smartphone, a validation form including a first icon identifying a first type of user-identifier, (ii) selecting, from the validation form, the first icon identifying the first type of user-identifier, (iii) recording, at the smartphone, a first image to perform a first user verification, (iv) transmitting, from the smartphone to an application server, the first image to perform the first user verification, and (v) receiving, at the smartphone from the application server, a first notification that indicates the first user verification was successful.

In yet another respect, an example embodiment takes the form of a smart phone comprising (i) a display device configured to display a validation form including a first icon identifying a first type of user-identifier, (ii) a user interface configured to select, from the validation form, the first icon identifying the first type of user-identifier, (iii) a computer-readable data storage configured to record a first image to perform a first user verification, and (iv) a network interface configured to transmit, to an application server, the first image to perform the first user verification, and to receive, from the application server, a first notification that indicates the first user verification was successful.

In yet another respect, an example embodiment takes the form of a method comprising (i) displaying, on a display device of a smartphone, a free-form entry field for entry of a mobile subscriber integrated services digital network-number (MSISDN), (ii) entering, using the smartphone, the MSISDN into the free-form entry field, (iii) transmitting the MSISDN from the smartphone to an application server, (iv) receiving, at the smartphone, a short message service (SMS) message comprising a personal identification number (PIN) provided by the application server, (v) transmitting the PIN from the smartphone to the application server, and (vi) receiving, at the smartphone from the application server, a first notification that indicates the application server successfully created a user account associated with the MSISDN.

In yet another respect, an example embodiment takes the form of a smartphone comprising (i) a processor, (ii) a user interface configured to display a free-form entry field for entry of a mobile subscriber integrated services digital network-number (MSISDN), and to enter the MSISDN into the free-form entry field, (iii) a network interface configured to (a) transmit the MSISDN entered using the user interface to an application server, (b) receive a short message service (SMS) message comprising a personal identification number (PIN) provided by the application server, (c) transmit the PIN to the application server, and (d) receive, from the application server, a first notification that indicates the application server successfully created a user account associated with the MSISDN.

In yet another respect, an example embodiment takes the form of a method comprising (i) displaying, on a display device of a first smartphone, a transfer form for entering a first transfer amount and a first receiver identity that identifies a first receiver for a first currency transfer, (ii) entering, using the transfer form, the first transfer amount and the first receiver identity, (iii) transmitting, from the first smartphone to an application server, the first transfer amount and the first receiver identity entered using the transfer form, and (iv) receiving, at the first smartphone from the application server, a first notification that indicates the first currency transfer to the first receiver has completed successfully.

In yet another respect, an example embodiment takes the form of a smartphone comprising (i) a display device configured to display a transfer form for entering a first transfer amount and a first receiver identity that identifies a first receiver for a first currency transfer, (ii) a user interface to enter, using the transfer form, the first transfer amount and the first receiver identity, and (iii) a network interface to transmit, to an application server, the first transfer amount and the first receiver identity entered using the transfer form, and to receive, from the application server, a first notification that indicates the first currency transfer to the first receiver has completed successfully.

In yet another respect, an example embodiment takes the form of a method comprising (i) receiving, at an application server, a first transfer amount and a first receiver identity that identifies a first receiver for a first currency transfer, (ii) confirming, using the application server, that the first receiver is registered to receive the first currency transfer at a receiver wallet, (iii) confirming, using the application server, that a sender wallet has sufficient funds to carry out the first currency transfer, (iv) debiting, using the application server, the sender wallet by at least the first transfer amount, and (v) crediting, using the application server, the receiver wallet by the first transfer amount.

In yet another respect, an example embodiment takes the form of an application server comprising (i) a processor, (ii) a computer-readable data storage device storing computer-readable program instructions executable by the processor, and (iii) a network interface configured to receive a first transfer amount and a first receiver identity that identifies a first receiver for a first currency transfer. The program instructions are executable by the processor to confirm that the first receiver is registered to receive the first currency transfer at a receiver wallet. The program instructions are executable by the processor to confirm a sender wallet has sufficient funds to carry out the first currency transfer. The program instructions are executable by the processor to debit the sender wallet by at least the first transfer amount. The program instructions are executable by the processor to credit the receiver wallet by the first transfer amount.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which.

DETAILED DESCRIPTION

I. Introduction

This description describes, among other things, example embodiments with respect to a payment system. In this description the terms 'user' and 'consumer' can be used interchangeably depending on the context, as can the terms "merchant" and "service provider".

In this description, the articles "a" or "an" are used to introduce elements of the example embodiments. The intent of using those articles is that there is one or more of the elements. The intent of using the conjunction "or" within a described list of at least 2 terms is to indicate any of the listed terms or any combination of the listed terms. The use of ordinal numbers such as "first," "second," "third" and so on is to distinguish respective elements rather than to denote a particular order of those elements.

The following abbreviations or acronyms are used in the description:

CVC—Card Verification Code;
FIG. —Figure;
FIGs.—Figures;
i.e.,—that is;
IMEI—International Mobile Equipment Identity;
IMSI—International Mobile Subscriber Identity;
Inc.—Incorporated;
Merchant App—Merchant Application Program;
MMS—multimedia messaging service;
MSISDN—Mobile Subscriber Integrated Services Digital Network-Number;
PIN—Personal Identification Number;
SMS—short message service; and
User App—User Application Program.

II. Example Architecture

Figure 1:
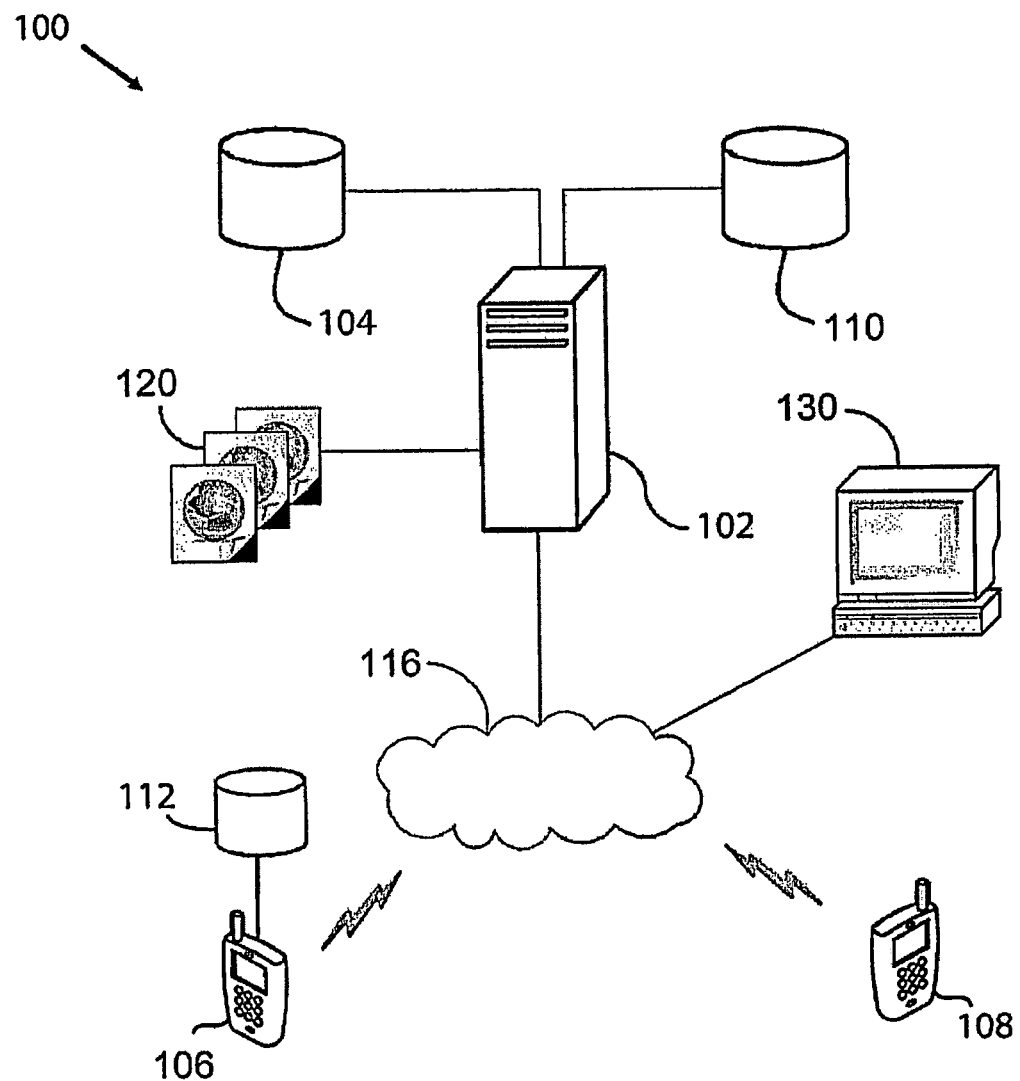
FIG. 1 is a schematic representation of a payment system.

FIG. 1 depicts a schematic representation of a payment system 100 for settling financial transactions in accordance with example embodiments described herein. The system 100 includes an application server 102 that maintains separate account balances ("wallets"), a user smartphone device 106, and a merchant terminal 108. The account balances are maintained in two databases 104 and 110. Database 104 maintains account balances to individual users, while database 110 maintains account balances belonging to merchants.

The user smartphone device 106 can take the form of a conventional smartphone handset provisioned with a web browser, and a wireless connection to the internet. The user smartphone 106 can be referred to as a "mobile wireless communication device," a "mobile smartphone handset" or, more simply, a "mobile smartphone" or "smartphone." As an example, the user smartphone device can be a cellular telephone. As another example, the user smartphone device can be an iPhone, such as the iPhone5, or an iPad sold by Apple Inc., Cupertino, Calif., United States.

The merchant terminal 108 can take the form of a conventional smartphone handset provisioned with a web browser and a wireless connection to the internet. The merchant terminal 108 can be referred to as a "merchant wireless communication device", a "merchant smartphone handset" or, more simply, a "merchant smartphone". As an example, the merchant wireless communication device can be a cellular telephone.

The application server 102, the user smartphone 106 and the merchant terminal 108 can communicate with each other using a communication network 116. The communication network 116 can comprise a wide-area network, such as the internet. Portions of communication network 116 can comprise a wireless network that carries out communications using radio frequency (RF) signals in accordance with an air interface protocol. As an example, the air interface protocol can comprise an air interface protocol such as LTE, CDMA, WiMAX, DEN, GSM, GPRS, UTMS, EDGE, MMDS, WIFI, or BLUETOOTH. Other portions of communication network 116 can comprise a wired network that carries out communication according to a wired communication protocol. As an example, the wired communication protocol can comprise an Ethernet protocol or some other wired communication protocol.

Communication between the application server 102, the user smartphone 106 and the merchant terminal 108 can be facilitated by using a server-hosted program (not shown), a user application program (a 'user app') that is installed and executed on the user smartphone 106, and a merchant application program (a 'merchant app') that is installed and executed on the merchant terminal 108. In another respect, communication between the application server 102 and user smartphone 106 can occur using network interface 184 (shown in FIG. 4) and network interface 152 (shown in FIG. 2).

Figure 2:
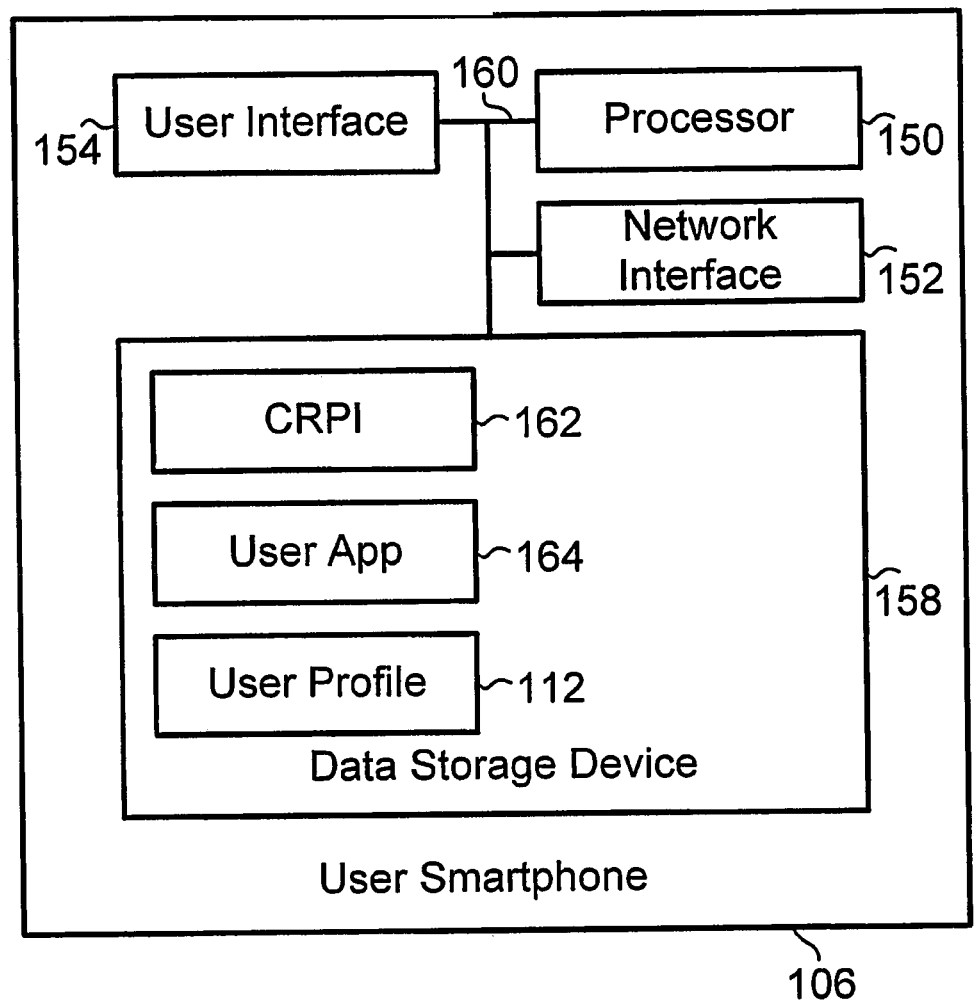
FIG. 2 is a block diagram of user smartphone in accordance with an example embodiment.

Next, FIG. 2 is a block diagram depicting an example embodiment of user smartphone 106. As shown in FIG. 2, user smartphone 106 includes (i) a processor 150, (ii) a network interface 152 for transmitting data to and receiving data from communication network 116, (iii) a user interface 154, and (iv) a data storage device 158, all of which can be linked together via a system bus or other connection mechanism 160. Data storage device 158 includes computer-readable program instructions (CRPI) 162, the user app 164, and a user profile 112. CRPI 162 can include the user app 164. Data storage device 158 can comprise a non-transitory computer-readable storage medium readable by processor 150. Each computer-readable storage medium described herein can comprise volatile and/or non-volatile storage components, such as optical, magnetic, organic or other memory or disc storage, which can be integrated in whole or in part with a processor.

Each processor described herein can comprise one or more general purpose processors (for example, INTEL single core microprocessors or INTEL multi-core microprocessors) or one or more special purpose processors (for example, digital signal processors). Processor 150 is configured to execute CRPI 162. A portion of CRPI 162 can be arranged as an operating system for smartphone 106. As an example, the operating system can be one of the following operating systems: Palm OS, Blackberry, Windows Mobile, Symbian, Android, and iPhone OS.

Each network interface described herein can carry out communications using one or more communication protocols. For devices configured to carry out communications using a wireless network, such as smartphone 106, network interface 152 can carry out communications via network 116 by use of an air interface protocol, such as one of air interface protocols referred to above. A transmission carried out by user app 164 can be carried out using network interface 152 and communication network 116.

The example embodiments refer to entering data using smartphone 106. In particular, the data can be entered onto a form displayed on smartphone 106. In one respect, the data can be entered onto a form can be entered onto the form via user interface 154. In another respect, the data can be entered onto the form by processor 150 executing CRPI 162 to prepopulate the data onto the form. In that regard, CRPI 162 can be configured to search for data to place onto a form field, such as an MSISDN, an IMEI, or IMSI. That search can be a search of data storage device 158.

This document includes example clauses to further describe example embodiments. Smartphone 106 can be arranged as a smartphone described in any example clause referring to a smartphone. Moreover, smartphone 106 can be arranged to perform any function described in an example clause as being performed by a smartphone or some component of a smartphone. Any data transmitted to or received by the smartphone 106 can be stored within data storage device 158.

Figure 3:
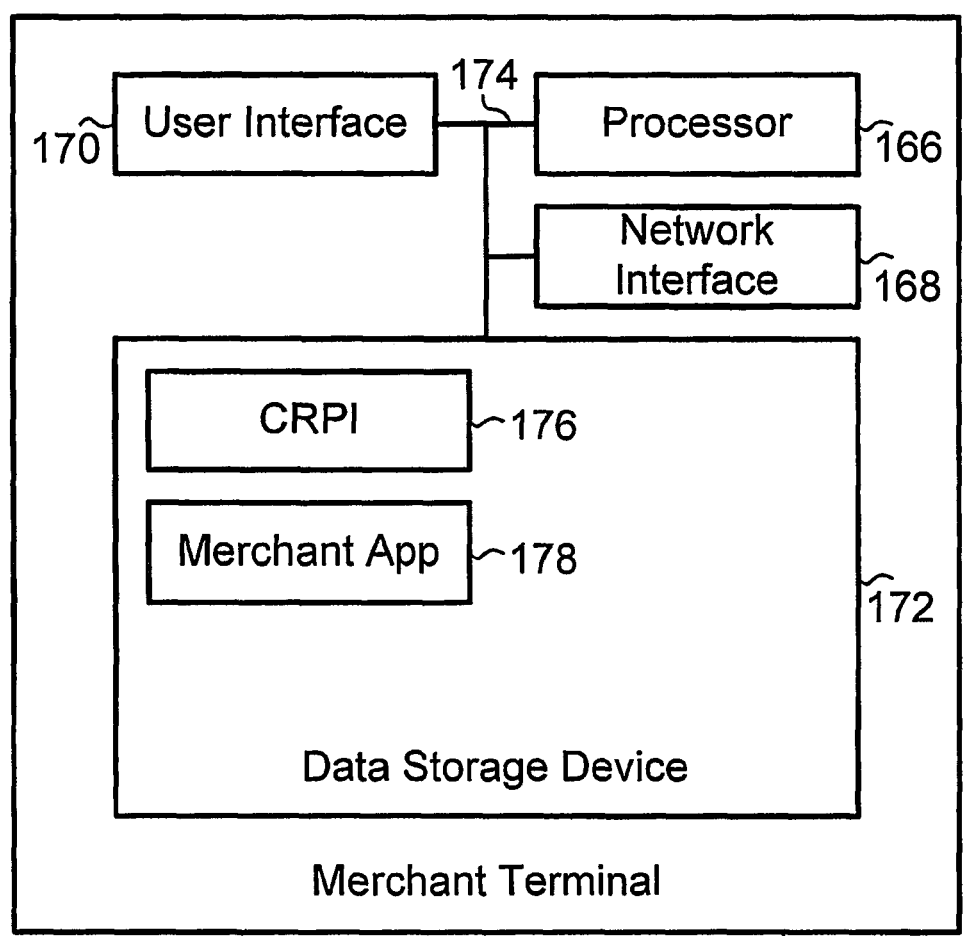
FIG. 3 is a block diagram of a merchant terminal in accordance with an example embodiment.

FIG. 3 is a block diagram depicting an example embodiment of merchant terminal 108. As shown in FIG. 3, merchant terminal 108 includes (i) a processor 166, (ii) a network interface 168 for transmitting data to and receiving data from communication network 116, (iii) a user interface 170, and (iv) a data storage device 172, all of which can be linked together via a system bus or other connection mechanism 174. Data storage device 172 includes computer-readable program instructions (CRPI) 176 and the merchant app 178. CRPI 176 can include the merchant app 178. Data storage device 172 can comprise a non-transitory computer-readable storage medium readable by processor 166. Processor 166 is configured to execute CRPI 176.

A user can download a copy of the user app from a download repository (for example, the application server 102) and install the user app on the user smartphone 106. A merchant can download a copy of the merchant app from a download repository (for example, the application server 102) and install the merchant app on the merchant terminal 108. A transmission carried out by a merchant app 178 can be carried out using network interface 168 and communication network 116.

This document includes example clauses to further describe example embodiments. Merchant terminal 108 can be arranged as a merchant terminal described in any example clause referring to a merchant terminal. Moreover, merchant terminal 108 can be arranged to perform any function described in any example clause as being performed by a merchant terminal or some component of a merchant terminal. Any data transmitted to or received by the merchant terminal 108 can be stored within data storage device 172.

Figure 4:
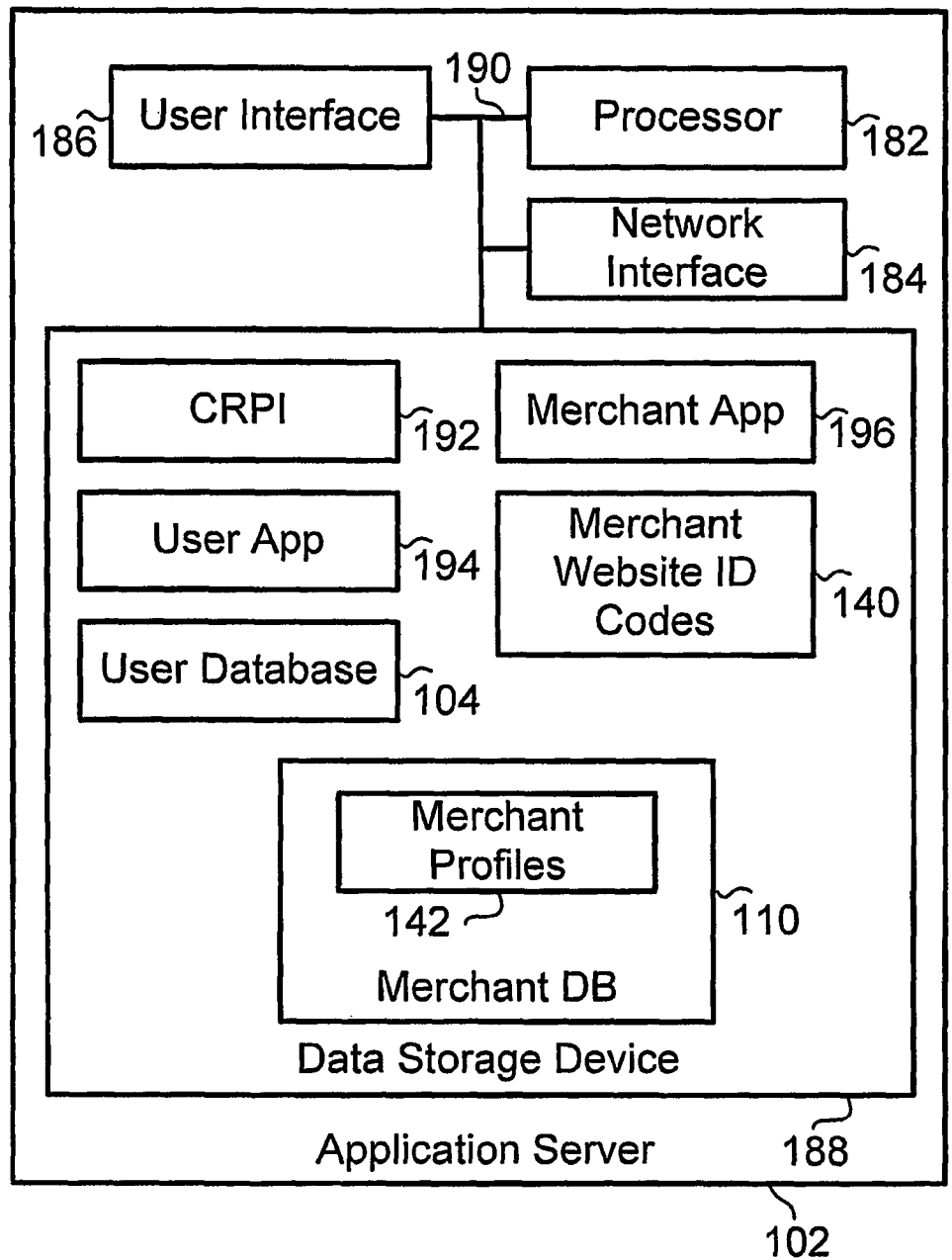
FIG. 4 is a block diagram of an application server in accordance with an example embodiment.

FIG. 4 is a block diagram depicting an example embodiment of application server 102. As shown in FIG. 4, application server 102 can include (i) a processor 182, (ii) a network interface 184 for transmitting data to and receiving data from communication network 116, (iii) a user interface 186, and (iv) a data storage device 188, all of which can be linked together via a system bus or other connection mechanism 190. Data storage device 188 can include (i) CRPI 192, (ii) the user app 194 for downloading to user smartphones, (iii) the merchant app 196 for downloading to merchant terminals, (iv) user database 104, (v) merchant identification codes 140 for merchant businesses, and (vi) merchant database 110 including merchant profiles 142. CRPI 192 can include the user app 194 and the merchant app 196. Data storage device 188 can comprise a non-transitory computer-readable storage medium readable by processor 182. Processor 182 is configured to execute CRPI 192.

This document includes example clauses to further describe example embodiments. Application server 102 can be arranged as an application server described in any example clause referring to an application server. Moreover, application server 102 can be arranged to perform any function described in any example clause as being performed by an application server or some component of an application server. Any data transmitted to or received by the application server 102 can be stored within data storage device 188.

III. User Registration

Figure 5:
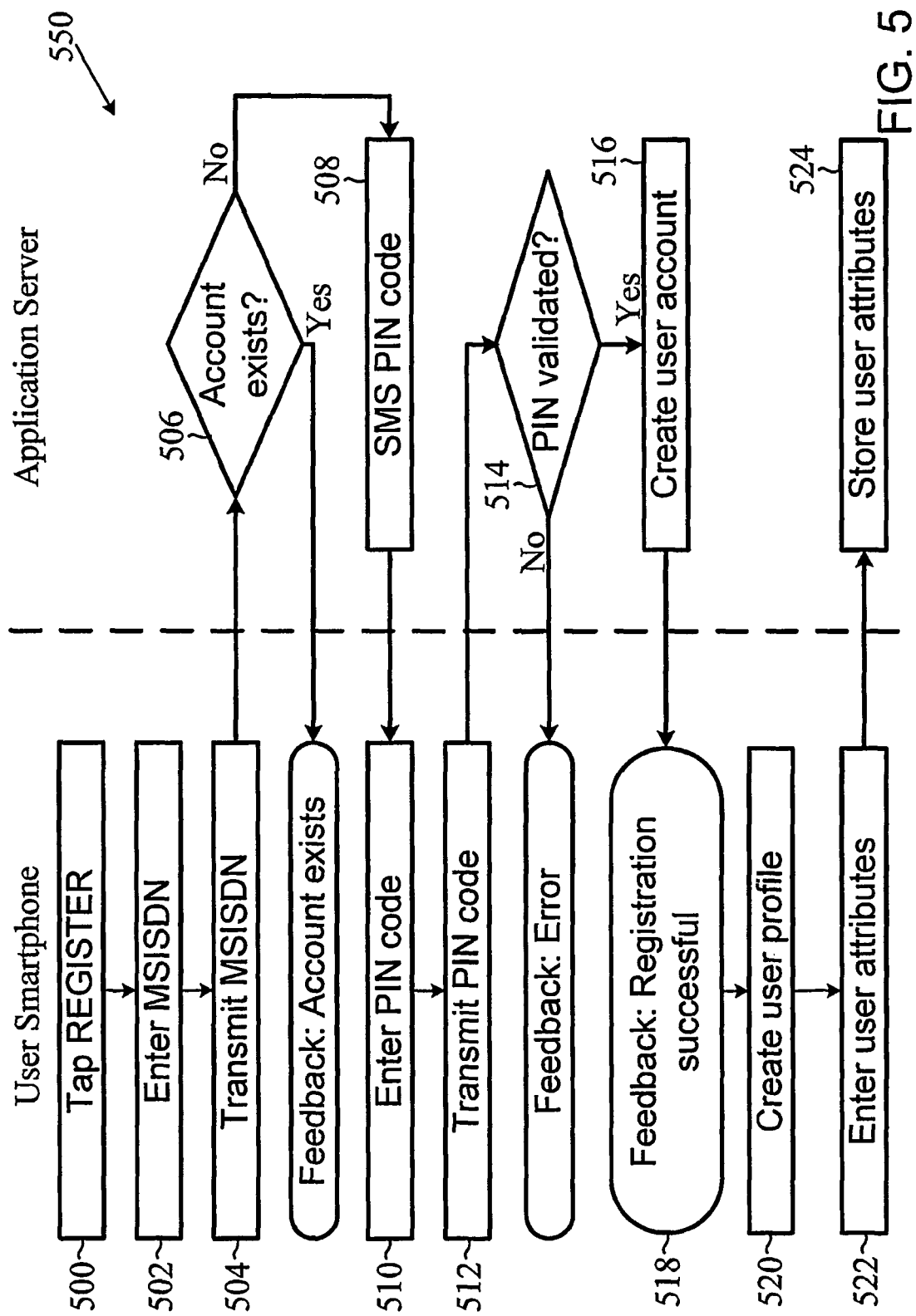
FIG. 5 is a is a flow chart of functions to register a user in accordance with an example embodiment of the system of FIG. 1.

Upon installation of the user app on the user smartphone 106, the user can initiate a registration process and create a user account on the application server 102. The user account can include a wallet from which or to which currency transfers can be made. FIG. 5 is a flow chart depicting a set of functions 550 that can be carried out in accordance with an example embodiment. The set of functions 550 can be performed to register a user account on the application server 102. The set of functions 550 are shown within blocks 500 through 524. A description of these blocks now follows.

At block 500, the user app displays a registration icon (not shown) on the user smartphone 106 which the user can activate in order to initiate a registration process. The registration icon can comprise the text "REGISTER" or some other text or symbol. At block 502, the user app displays a free-form entry field on the user smartphone 106 in which the user is prompted to enter the user's Mobile Subscriber Integrated Services Digital Network Number ('MSISDN', the user's mobile telephone number) or some other unique identifier of the user smartphone 106, such as an International Mobile Equipment Identity (IMEI), or a unique identifier, such as an International Mobile Subscriber Identity (IMSI). The user app transmits the user's MSISDN (or other unique identifier) to the application server 102 (block 504) which performs a lookup, at block 506, to check whether a user account associated with the user's mobile telephone number (or other unique identifier) already exists in the user database 104. If no such user account exists, the application server 102 responds to the user smartphone 106 with an SMS containing a one-time PIN code (block 508). At block 510, the user can then enter the PIN code into a corresponding field displayed by the user app. At block 512, the user smartphone 106 returns the user-entered PIN code to the application server 102, which validates the returned PIN (block 514). If the PIN validation is successful the application server, at block 516, creates a user account in the user database 104 and notifies the user app on the user smartphone 106 that registration has been successful (block 518). For purposes of this description, the PIN code does not have to be entirely numeric, although it can be entirely numeric. A PIN code that is not entirely numeric can be an alpha-numeric PIN code.

At block 520, the user app 164 creates a user profile 112 on the user smartphone 106 and prompts the user to enter user attributes (block 522) such as the user's first name, the user's last name, date of birth, an e-mail address, a physical address, an account currency, and details of one or more payment instruments such as credit or debit cards. In accordance with at least some example embodiments, the user smartphone passes the data in the user profile 112 to the application server 102 (block 524) which stores these particulars in the newly-created user account in the user database 104. In accordance with at least some example embodiments, user app 164 can be configured to retrieve or receive at least one user attribute prior to prompting the user to enter the user attributes.

The application server 102 hosts a merchant portal website 120 that enables merchants to register and create individual merchant accounts that are maintained by the application server 102 in the merchant database 110. The merchant portal website 120 can be referred to as a "portal website." Merchant registration and creation of a merchant account in the merchant database 110 can be performed online by the merchant portal website 120. A merchant can use a merchant computing device 130 including a display for displaying websites to display merchant portal website, and an input device for selecting or entering data onto the merchant portal website.

IV. Merchant Registration

Figure 6:
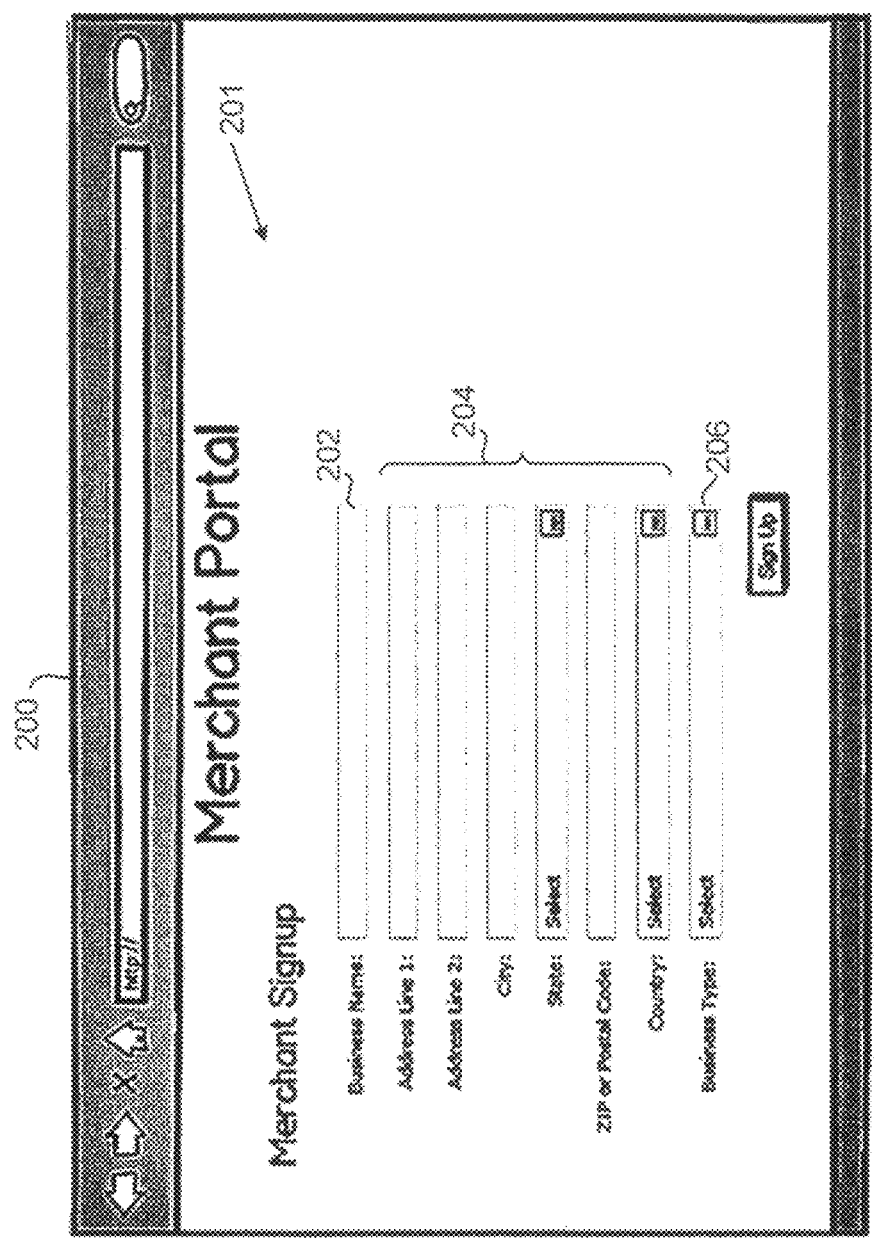
FIG. 6 is a representation of a webpage of a merchant portal website hosted on an application server in the system of FIG. 1.

FIG. 6 shows an example webpage 200 of the merchant portal website 120. The webpage 200 can display a registration form 201 that a merchant can complete in order to register with the merchant portal website 120. The webpage 200 can be a homepage of the merchant portal website 120. As an example, the registration form 201 can include the following fields: a merchant's business name 202, a merchant's business address 204, and a description of the merchant's business 206. As an example, the business description can be an online store, a utility company, an internet service provider, a dentist, or some other business description. Other examples of fields on the registration form 201 are possible. Entering data into the registration form 201 can occur, for example, by typing data or selecting data from a list of predetermined data.

Upon completion of the registration form, the application server 102 can create a merchant account in the merchant database 110. The application server 102 can assign a unique merchant identification code to each merchant account established in this manner and the merchant identification code together with the data in the merchant registration form is stored in the newly-created merchant account in the merchant database 110. For the sake of being brief, a merchant identification code can be referred to as an "identification code."

V. Pre-Funding a User Wallet

Figure 7:
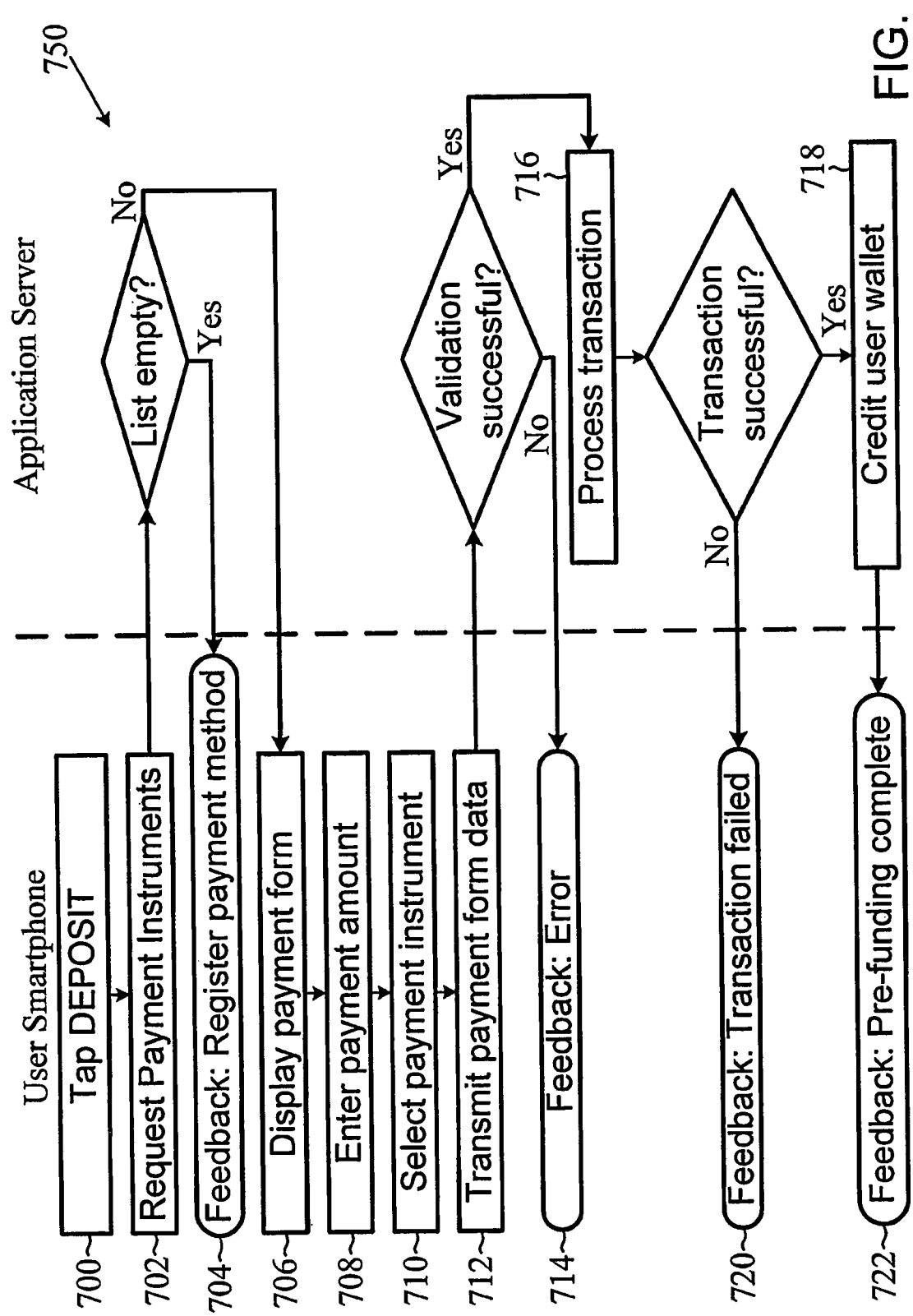
FIG. 7 is a flow chart of functions to carry out pre-funding of a user wallet in accordance with an example embodiment of the system of FIG. 1.

FIG. 7 is a flow chart depicting a set of functions 750 that can be carried out in accordance with an example embodiment. The set of functions 750 can be performed to pre-fund a user wallet in the user database 104 on the application server 102. The set of functions 750 are shown within blocks 700 through 722. A description of these blocks now follows.

At block 700, the user app 164 displays a deposit icon (not shown) on the user smartphone 106 that the user can activate in order to fund the user wallet. The deposit icon can comprise the text "DEPOSIT" or some other text or symbol. The scanner app requests, at block 702, a list of approved payment instruments from the application server 102 that are contained in the user's profile in the user database 104. If the list of approved payment instruments is empty, the user app prompts the user, at block 704, to provide and register at least one payment instrument such as a credit card or a debit card, for example, with which to pre-fund the user's wallet.

If, on the other hand, the list of approved payment instruments is non-empty, the user app displays a payment form on the user smartphone 106 (block 706). The payment form includes a field in which the user can enter an amount of money (i.e., currency) to be credited to the user wallet (block 708) and a field in which the user can select a payment instrument with which to pre-fund (block 710) from a drop-down list of the approved payment instruments returned by the application server 102.

At block 712, once the user has completed the payment form, the user smartphone 106 transmits the payment form data to the application server 102 for further processing. If the payment form data is incomplete or not validated, the application server 102 transmits an error message to the user smartphone 106, causing the user app to display a notification to the user that one or more entries in the payment form are invalid (block 714). If the payment form data is successfully validated, the application server 102 processes the pre-funding transaction (block 716) and, if the pre-funding transaction completes successfully, credits the user's wallet (block 718) with the amount of money specified by the user in the payment form and notifies the user smartphone 106 that the pre-funding transaction has completed successfully (block 720). If the pre-funding transaction does not complete successfully the application server notifies the user smartphone of the failure, causing the user app to notify the user that the pre-funding transaction has failed (block 722).

VI. Funds Transfer

Figure 8:
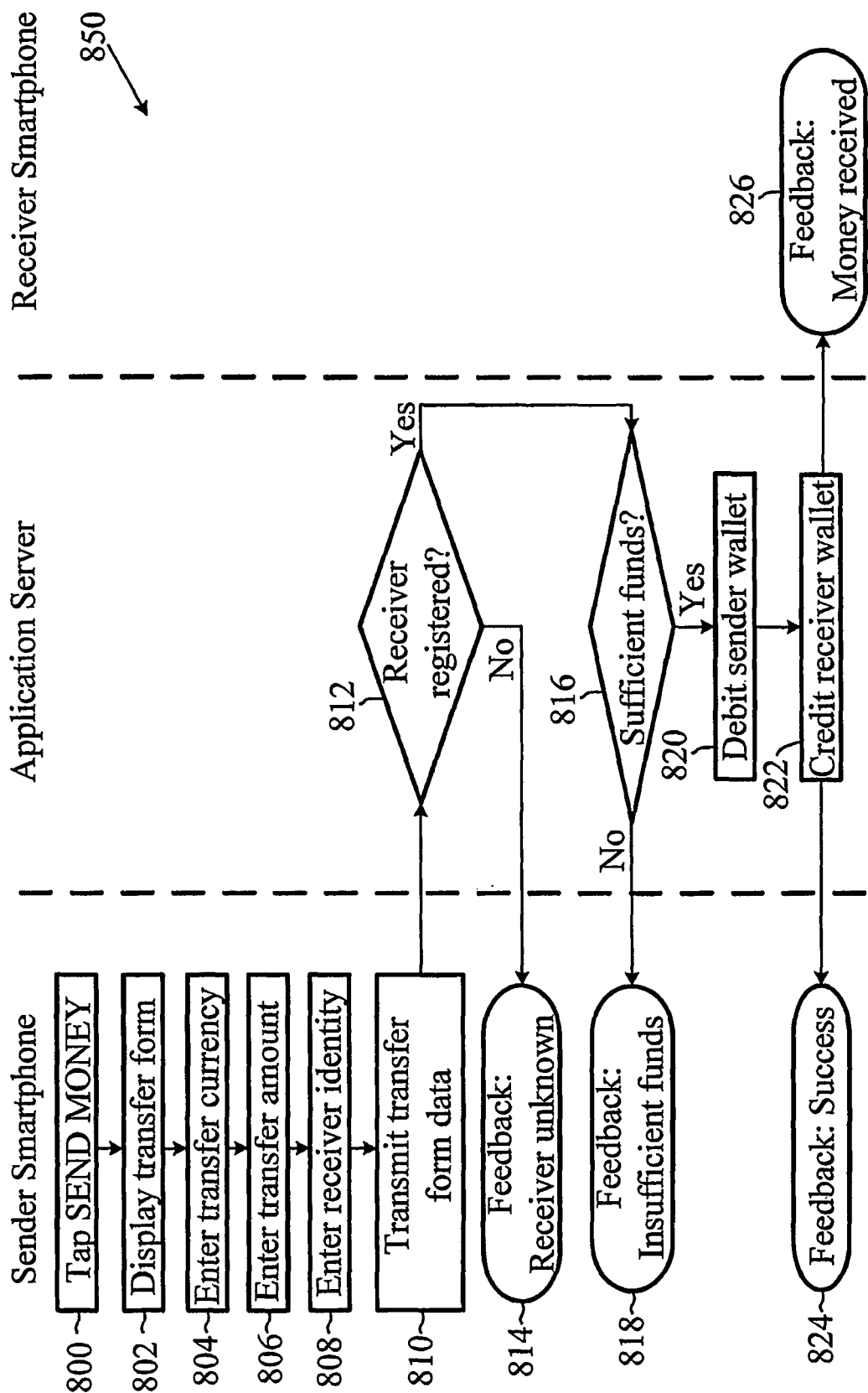
FIG. 8 is a flow chart of functions to perform inter-user funds transfer in accordance with an example embodiment of the system of FIG. 1.

FIG. 8 is a flowchart depicting a set of functions 850 that can be carried out in accordance with an example embodiment. The set of functions 850 can be performed to transfer funds from one user to another by using the system 100. The set of functions 850 are shown within blocks 800 through 826. In this embodiment the sending user will, for convenience, be referred to as the sender and the receiving user will be referred to as the receiver. The sender uses a sender smartphone. The receiver uses a receiver smartphone.

At block 800, the user app on the sender's smartphone 106 displays a send-money icon (not shown) that the sender can activate in order to initiate a transfer of funds. The deposit icon can comprise the text "SEND MONEY" or some other text or symbol. The user app displays a transfer form on the sender's smartphone 106 (block 802). The transfer form includes fields in which the sender can enter a transfer currency (block 804) (for example, British pounds, Japanese yen, or United States dollars), a transfer amount (block 806) and an identity of a receiver (block 808). The sender can identify the receiver either by means of the sender's MSISDN or by selecting the receiver from the sender's contacts list on the sender's smartphone 106, in which case the user app automatically populates the receiver identity field in the transfer form with the receiver's mobile telephone number from the contacts list.

At block 810, once the user has completed the transfer form, the sender's smartphone 106 transmits the transfer form data to the application server 102 for further processing. The application server verifies the transfer form data by firstly performing a lookup in the user database 104 (using the receiver's mobile telephone number as an index) to determine whether the receiver is registered with the application server 102 and has a user wallet (block 812). If the receiver does not have a registered user wallet, the sender's smartphone 106 is notified, at block 814, that the transfer cannot be processed.

If the receiver does have a registered user wallet, the application server 102 verifies that the sender's user wallet contains sufficient funds for the transfer (block 816). If there are insufficient funds in the sender's user wallet the application server 102 notifies the sender's smartphone, at block 818, that the transfer cannot be completed. If the sender's wallet does have sufficient funds, the application server 102 debits the transfer amount from the sender's wallet (block 820) and credits the receiver's wallet with the same amount (block 822). The application server 102 then notifies the sender's smartphone 106 (at block 824) that the funds transfer transaction has completed successfully. The application server also pushes a message, for example an SMS or an e-mail, to the receiver's smartphone 106 (at block 826), that funds have been received into the receiver's user wallet.

VII. Virtual Credit Card

As part of a successful registration process in which the application server 102 creates a new user account in the user database 104, the application server can also issue the new user with a virtual credit card for use in making purchases from online merchants. The virtual credit card, which can be issued automatically or as a result of a request by the user, has all the elements required to make purchases from online merchants, for example a credit card number, a cardholder's name, a card expiry date, a CVC, or a PIN. The virtual credit card can have a short period of validity, for example one or three months or, alternatively, can be a single-use only credit card. The virtual credit card is linked to the user's wallet and must be pre-funded prior to use.

Figure 9:
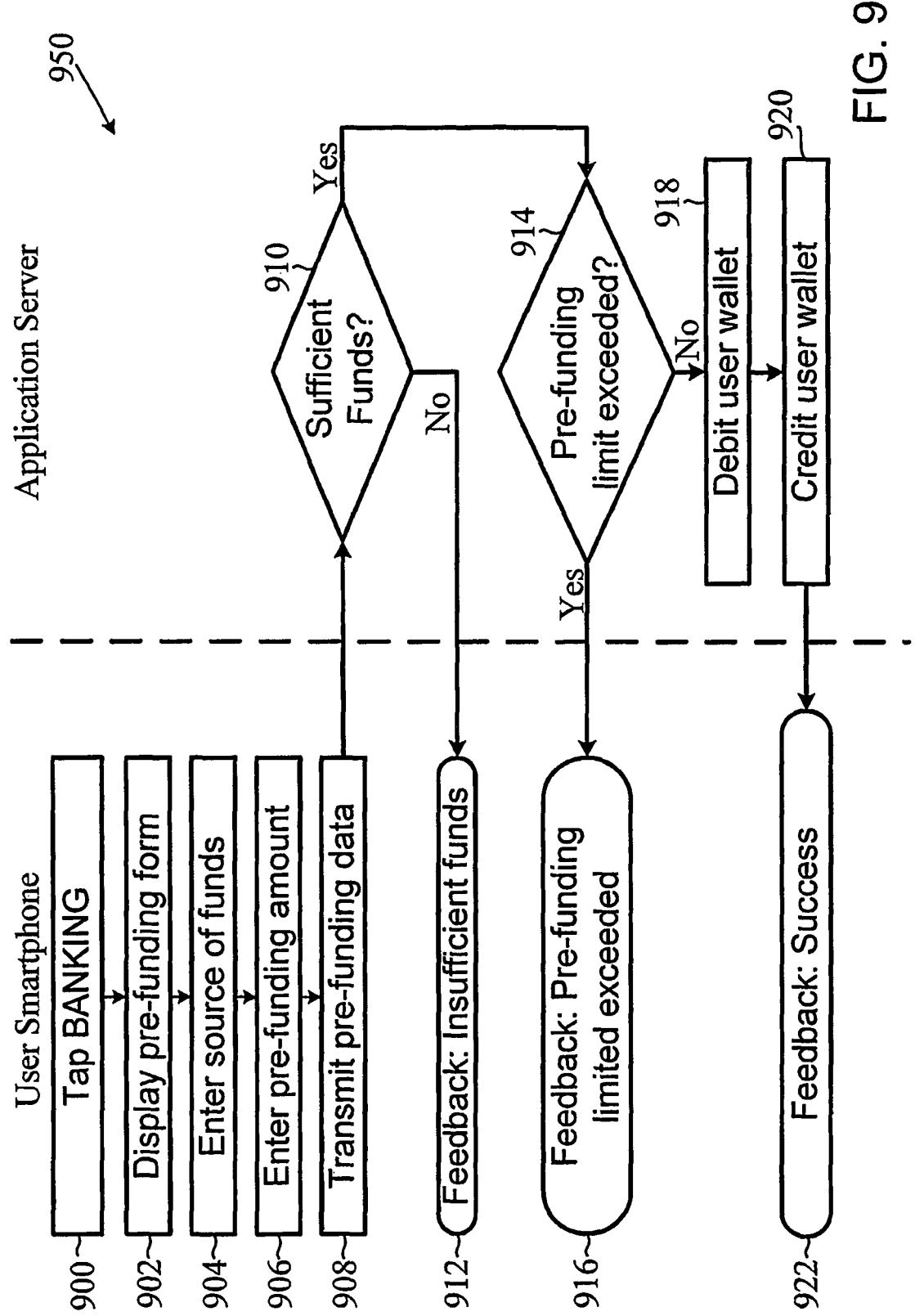
FIG. 9 is a flow chart of functions to carry out pre-funding of a virtual credit card in accordance with an example embodiment of the system of FIG. 1.

FIG. 9 is a flow chart depicting a set of functions 950 that can be carried out in accordance with an example embodiment. The set of functions 950 can be performed to pre-fund a virtual credit card associated with a user wallet in the user database 104 on the application server 102. The set of functions are shown within blocks 900 through 922.

At block 900 the user app displays a banking icon (not shown) on the user smartphone 106 that the user can activate in order to pre-fund the user's virtual credit card. The deposit icon can comprise the text "BANKING" or some other text or symbol. The user app displays a pre-funding form on the user smartphone 106 (block 902). The pre-funding form includes fields in which the user can specify a source of funds for pre-funding the virtual credit card (block 904) and a pre-funding amount (block 906). As an example, the user can select the user's wallet as the pre-funding source. The pre-funding form can allow selection of a currency type. At block 908, once the user has completed the pre-funding form, the user smartphone 106 transmits the pre-funding data (entered via the pre-funding form) to the application server 102 for further processing.

The application server 102 verifies the pre-funding data by determining whether the user's wallet contains sufficient funds for the pre-funding transaction (block 910). If the user's wallet does not contain sufficient funds, the application server 102 notifies the user smartphone 106, at block 912, that the pre-funding transaction cannot be completed. The virtual credit card can be subject to a predetermined pre-funding limit. In this case, at block 914, the application server 102 determines whether the pre-funding transaction would cause the pre-funding limit of the virtual credit card to be exceeded, in which case the application server notifies the user's smartphone 106 that the pre-funding transaction cannot be carried out (block 916).

If there are sufficient funds in the user's wallet and the pre-funding limit will not be exceeded, the application server 102 debits the pre-funding amount from the user's wallet (block 918) and credits the virtual credit card with the same amount (block 920). The application server 102 then notifies the user's smartphone 106 (at block 922) that the pre-funding transaction has completed successfully.

VIII. Promotional Vouchers

A merchant can offer promotional vouchers for different reasons, for example as a way to create a customer database for purposes of customer relationship management, or for completing a questionnaire or participating in a survey. A promotional voucher can, for example, be one that can be exchanged for a discounted or free item or service, or can be a right to purchase an item or a service from a merchant and receive a further one for free. A merchant promotion can be an online or an offline promotion. An online promotion can, for example, be published on the merchant's website, in online brochures or in online catalogues. An offline promotion can, for example, be published in newspapers, magazines, billboards, flyers, information boards and the like, or can be conducted in-store at points of sale.

The merchant creates a promotion-specific Quick Response (QR) code. QR codes are well known and widely used. The promotion-specific QR code encodes information relevant to the particular promotion, such as the merchant identification code 140, a promotion identifier, and an address of a repository (not shown) to which the user can submit personal information, for example an e-mail address. The merchant also generates, by using the merchant portal website 120, a finite number of promotional vouchers on the application server 102 that are linked to the promotion identifier encoded in the QR code. Each voucher can, for example, be an image file in JPEG or PNG format and is uniquely identified by means of a voucher identification code. The voucher can be valid for a limited period of time after issue or can have a fixed expiry date. Furthermore, the voucher can be coded for face-to-face redemption only, for online redemption only, or for both online and face-to-face redemption. The voucher can also include geographical restrictions, for example the voucher may only be redeemable at the merchant's outlets in a particular town or city, or in a particular country.

Figure 10:
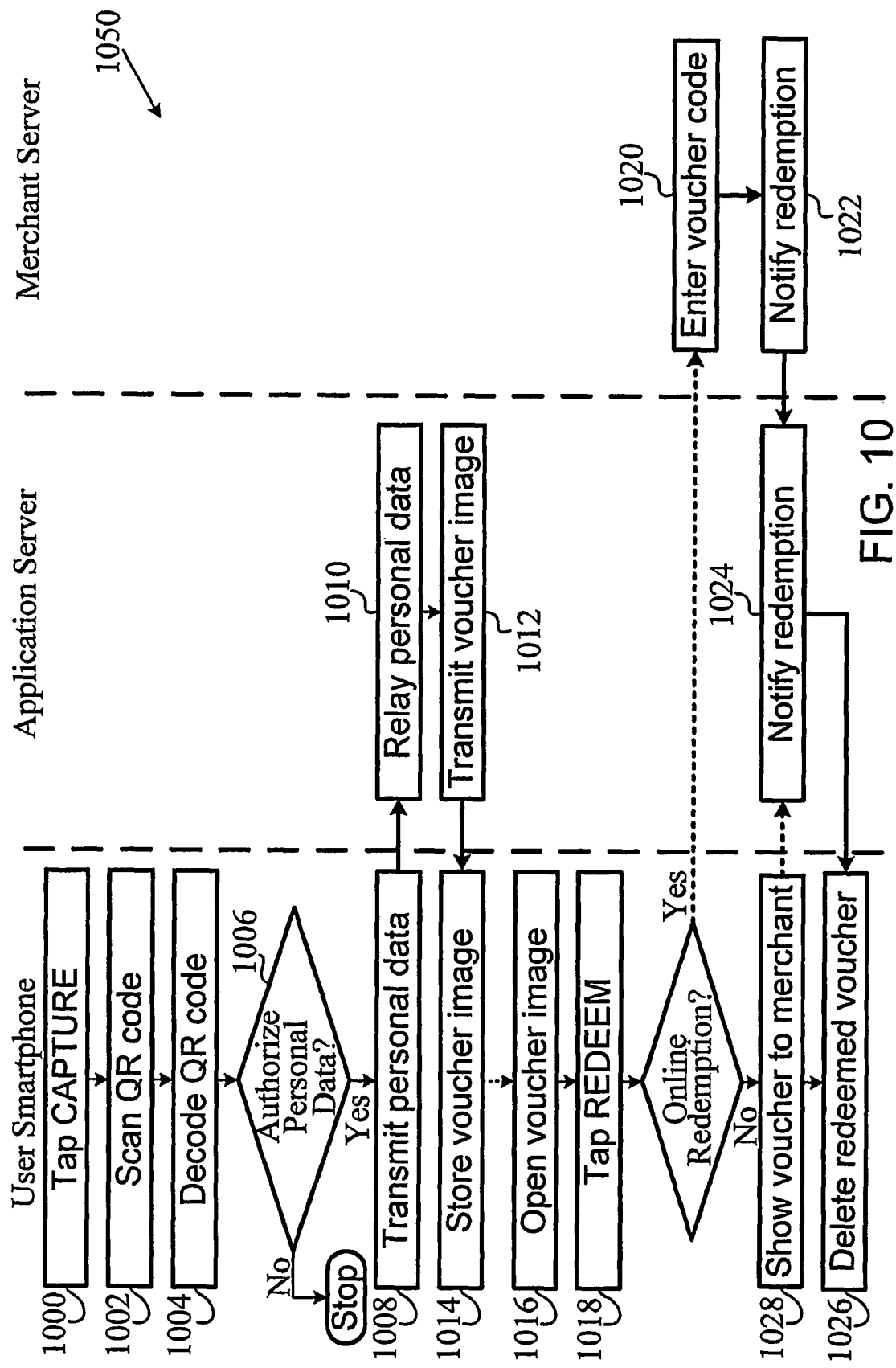
FIG. 10 is a flow chart of functions to capture and redeem promotional vouchers in accordance with an example embodiment of the system of FIG. 1.

FIG. 10 is a flow chart depicting a set of functions 1050 that can be carried out in accordance with an example embodiment. The set of functions 1050 can be performed to enable a user to acquire promotional vouchers from merchants and to redeem such vouchers. The set of functions 1050 are shown within blocks 1000 through 1028

At block 1000 the user app displays a capture icon (not shown) on the user smartphone 106 that the user can activate in order to capture a promotional voucher. The deposit icon can comprise the text "CAPTURE" or some other text or symbol. The user scans the QR code, at block 1002, with the user smartphone 106 which then decodes the scanned QR code (block 1004) to recover the information that it contains, namely the merchant identification code 140, the promotion identifier and the repository address. The user app prompts the user, at block 1006, to authorise transmission of selected user personal information in the user profile 112 to the merchant's repository, for example, the user's name, e-mail address, MSISDN and country of residence. If the user authorises the transmission, the user smartphone 106 transmits, at block 1008, the selected personal information to the application server 102 together with the merchant identification code 140, the promotion identifier and the repository address. At block 1010 the application server 102 transmits the selected personal information to the repository (not shown). The application server can then transmit one of the generated vouchers linked to the promotion identifier to the user smartphone 106 (block 1012). The user smartphone stores the received voucher image in the user profile 112 (block 1014).

The user app on the user smartphone 106 can display a list of all unredeemed promotion vouchers that are stored in the user profile 112 and the user can search the list of vouchers by date, merchant and date of expiration. In order to redeem a particular voucher the user can select and open the voucher in question (block 1016) and activate a redemption icon (not shown) that appears on the voucher image (block 1018). The redemption icon can comprise the text "REDEEM" or some other text or symbol. If the voucher is coded for online redemption, the user enters the unique voucher identification code, in the checkout page of the merchant's website (block 1020), which applies the applicable discount to the amount due for the user's purchase. The amount due may, of course, be zero if the user purchase is free in terms of the promotion. The merchant server (not shown) notifies the application server 102 that the particular voucher has been redeemed (block 1022). The application server 102 changes the status of the particular vouchers to 'redeemed' and relays the notification, at block 1024, to the user smartphone 106 where the user app deletes the redeemed voucher from the user profile 112 (block 1026).

If the voucher is coded for face-to-face redemption, the user displays the voucher to be redeemed to the merchant (block 1028). The merchant can then enter the unique voucher identification code into the merchant app on merchant terminal 108. The merchant terminal 108 notifies the application server 102 that the particular voucher has been redeemed, the application server 102 changes the status of the particular voucher to 'redeemed' and the redeemed voucher is then deleted from the user profile 112 on the user smartphone 106 as previously described.

IX. User Verification

After creating a user profile 112 on the user smartphone 106, it may be necessary for the user to verify the user account for reasons of regulation or compliance by providing proof of identity and proof of residence. Furthermore, as a security measure, the user can also be required to validate one or more payment instruments that the user has added to the user profile 112.

Figure 11:
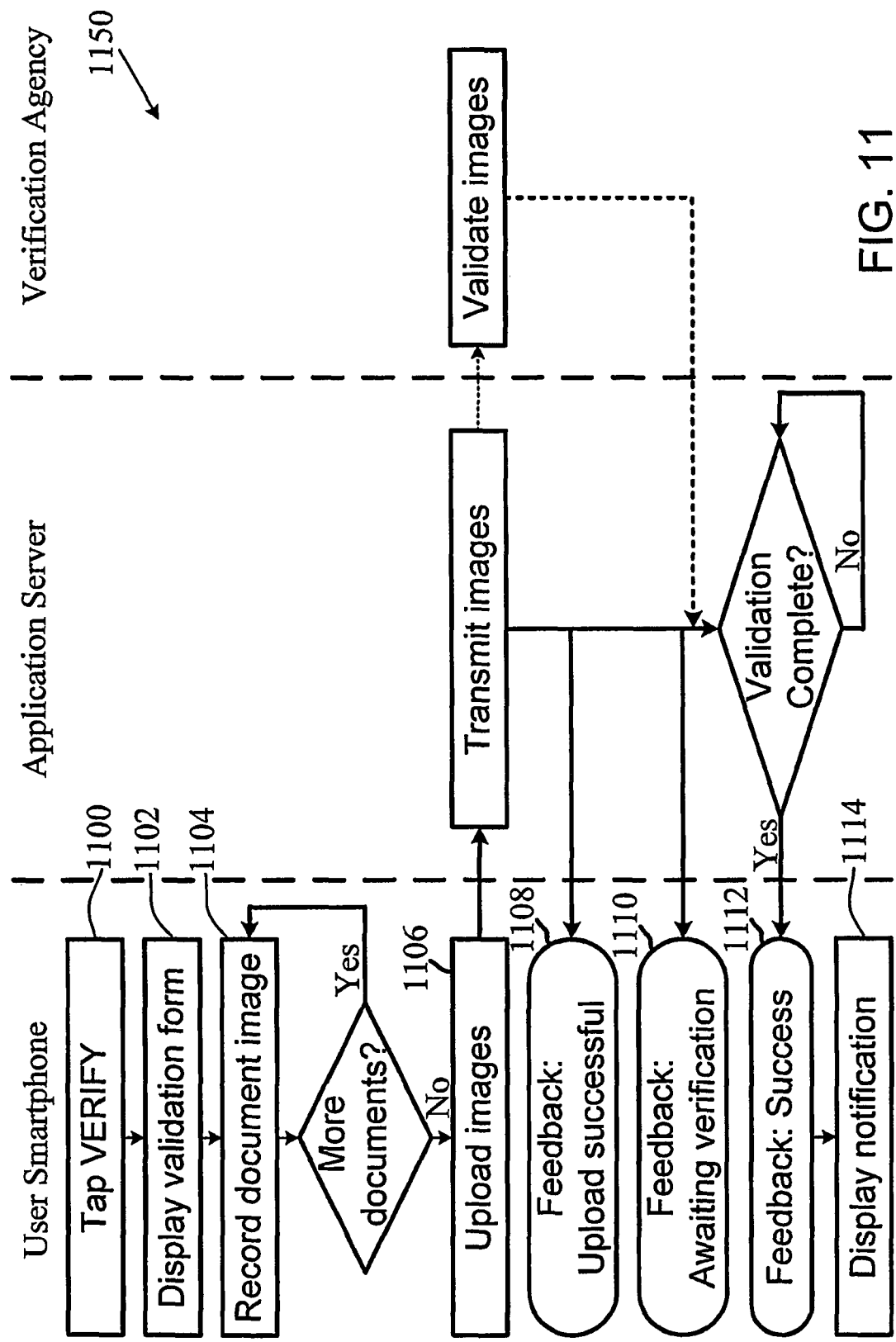
FIG. 11 is a flow chart of functions to verify a user account in accordance with an embodiment of the system of FIG. 1.
Figure 12:
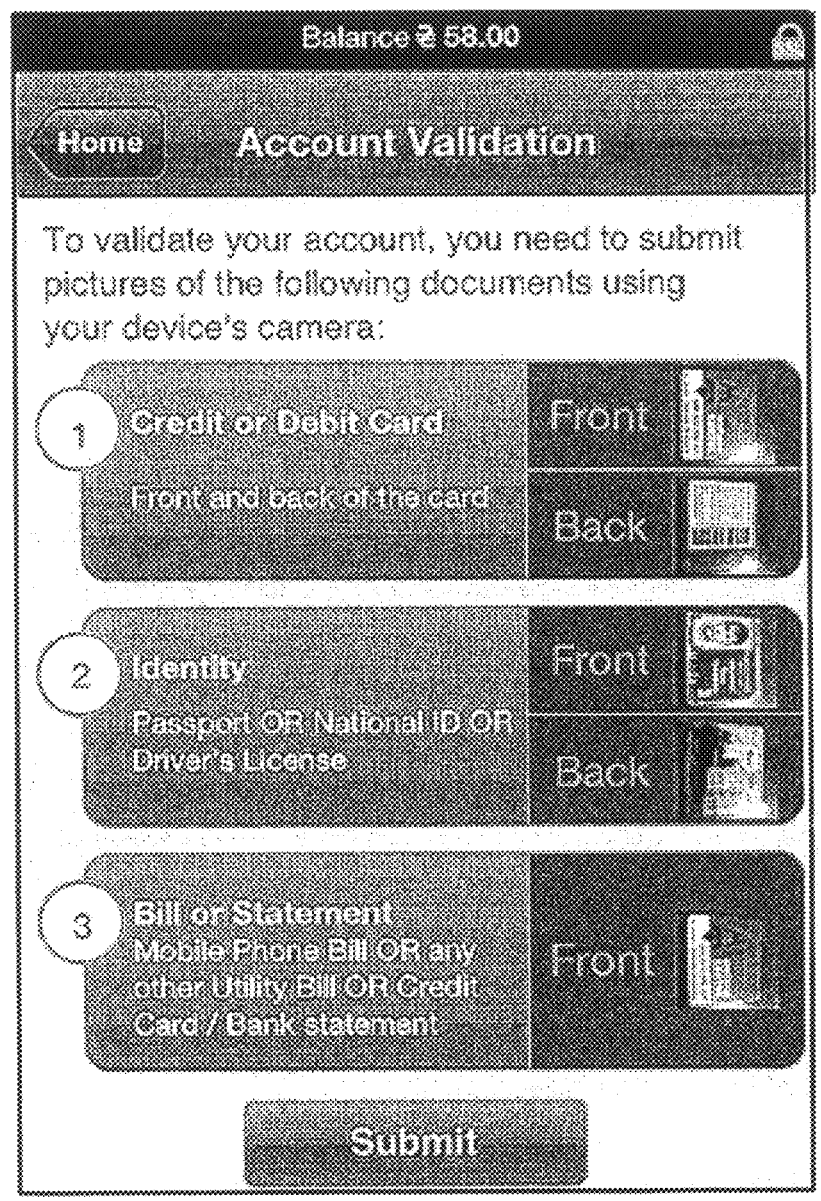
FIG. 12 is an example display of a verification form provided by user application in accordance with an example embodiment.

FIG. 11 is a flow chart depicting a set of functions 1150 that can be carried out in accordance with an example embodiment. The set of functions 1150 can be performed to enable a user to verify the user's account on the application server 102. The verification, which can be carried out by a verification agent device, can include reporting successful verification to the application server 102. The set of functions are shown within blocks 1100 through 1114.

At block 1100 the user app displays a verification icon (not shown) on the user smartphone 106 that the user can activate in order to verify the user's personal details in the user profile 112. The verification icon can comprise the text "VERIFY" or some other text or symbol. The user app displays a verification form on the user smartphone 106 (block 1102). The verification form includes icons that the user can activate to take images of required documentation using a camera on the user smartphone 106. The required documentation can, for example, consist of one or more of the user's driving license, identity document or passport, utility bill, mobile phone bill or bank statement, front and reverse of a payment instrument such as a credit card in the user profile 112. Each icon is labelled to indicate which document it relates to.

At block 1104 the user activates an icon and utilises the user smartphone camera to take an image of the document. When the image of the document has been recorded, the corresponding icon becomes inactive (for example, greys out). The user repeats the process until all the required images have been taken. The user smartphone 106 then uploads the images, at block 1106, to the application server 102 at maximum resolution. Alternatively, the images can be uploaded at a resolution less than maximum resolution. At block 1108 the user app displays a notification confirming receipt of the uploaded images and advising that the documentation is awaiting verification (block 1110). Once the documentation has been verified, the application server 102 notifies the user smartphone 106 (at block 1112) and the user app displays, at block 1114, a notification that the user account has been successfully verified.

X. Variations

Clearly, numerous variations and permutations are possible to the embodiment without departing from the scope of this disclosure. Some of these variations and permutations are described below.

1. The user app on the user smartphone 106 can monitor the expiry dates of promotional vouchers stored in the user profile 112 and notify the user, for example by means of an e-mail message, whenever a voucher is approaching expiry. Other messages or alerts can be provided to notify the user of the approaching expiry.

2. A promotional voucher stored in the user profile 112 can also include the GPS co-ordinates of a merchant store where the voucher is to be redeemed. If the user smartphone 106 has a GPS receiver, the user app on the user smartphone 106 can be configured to alert the user to redeem the voucher if the user is within a predetermined distance from the merchant store.

3. A merchant can configure the promotional vouchers generated on the merchant portal website 120 to allow a user to share a voucher with other users of the system 100, either once only or up to a predetermined number of times.

In order to share a particular voucher the user can select and open the voucher in question and activate a SHARE icon (not shown) that appears on the voucher image. The user app then displays a transfer form on the user's smartphone 106 in which the user can specify an identity of the intended receiver. The receiver can be identified by means of the receiver's MSISDN or by selecting the receiver from the user's contacts list on the user's smartphone 106, in which case the user app automatically populates the receiver identity field in the transfer form with the receiver's mobile telephone number from the contacts list.

Once the user has completed the transfer form, the user smartphone 106 transmits the transfer form to the application server 102 for further processing. The application server verifies the transfer form data by performing a lookup in the user database 104 to determine whether the receiver is registered with the application server 102. If the receiver is not registered, the application server notifies the user smartphone 106 that the voucher sharing cannot be completed. If the receiver is registered, the application server 102 transmits a further generated voucher linked to the same promotion identifier to the recipient's smartphone where it is stored as an unredeemed voucher. The original voucher on the user's smartphone is unchanged.

In an alternative arrangement, the user smartphone 106 can attach the promotion voucher to an MMS message and the network interface 152 can transmit the MMS message via communication network 116 in order to share the promotion voucher.

XI. Additional Example Embodiments

The following clauses are offered as further description of the disclosed inventions.

Clause 49—A method comprising:
displaying, on a display device of a smartphone, a validation form including a first icon identifying a first type of user-identifier;
selecting, from the validation form, the first icon identifying the first type of user-identifier;
recording, at the smartphone, a first image to perform a first user verification;
transmitting, from the smartphone to an application server, the first image to perform the first user verification; and
receiving, at the smartphone from the application server, a first notification that indicates the first user verification was successful.

Clause 50—The method of clause 49, further comprising:
inactivating the first icon while the validation form is displayed, wherein the first icon is inactivated in response to recording the first image to perform the first user verification.

Clause 51—The method of any one of clauses 49-50, wherein the validation form further includes at least one additional icon identifying at least one additional type of user-identifier, wherein each additional icon identifies a respective additional type of user-identifier;
selecting, from the validation form, a second icon identifying a second type of user-identifier;
recording, at the smartphone, a second image to perform the first user verification; and
transmitting, from the smartphone to an application server, the second image to perform the first user verification.

Clause 52—The method of clause 51,
inactivating the second icon while the validation form is displayed, wherein the second icon is inactivated in response to recording the second image to perform the first user verification.

Clause 53—The method of clause 51,
selecting, from the validation form, a third icon identifying a third type of user-identifier;
recording, at the smartphone, a third image to perform the first user verification; and
transmitting, from the smartphone to an application server, the third image to perform the first user verification.

Clause 54—The method of clause 53, inactivating the third icon while the validation form is displayed, wherein the third icon is inactivated in response to recording the third image to perform the first user verification.

Clause 55—The method of any one of clauses 49-54, wherein the first type of user-identifier is selected from the group consisting of a credit card front side, a credit card back side, a debit card front side, a debit card back side, a driver's license front side, a driver's license back side, a passport, a bill, a mobile phone bill, a utility bill, a statement, a credit card statement, and a bank statement.

Clause 56—The method of any one of clauses 49-55, further comprising:

creating a user profile at the smartphone.

Clause 57—The method of clause 56, wherein the user profile comprises payment instrument data, and wherein the first user verification is performed to verify the payment instrument data.

Clause 58—The method of any one of clauses 49-57, further comprising:

displaying, on the display device, an icon selectable to start a user-verification; and selecting, using the smartphone, the selectable icon associated with user verification, wherein selecting the selectable icon associated with user verification triggers displaying the validation form.

Clause 59—The method of clause 58, wherein displaying the icon selectable to start the user-verification comprises displaying a verification icon.

Clause 60—The method of any one of clauses 49-59, further comprising:

receiving, at the smartphone, a second notification that indicates the application server successfully uploaded an image transmitted to the application server for the first user verification.

Clause 61—The method of clause 60, further comprising:

receiving, at the smartphone, a third notification that indicates the application server is awaiting verification of an image transmitted to the application server for the first user verification.

Clause 62—The method of clause 61, further comprising:

receiving, at the smartphone, a fourth notification that indicates the first user verification completed successfully.

Clause 63—The method of clause 62, further comprising:

displaying the fourth notification on the display device.

Clause 64—A smartphone comprising:

a processor; and a computer-readable data storage device comprising program instructions executable by the processor to carry out a method of any one of clauses 49 through 63.

Clause 65—A computer-readable data storage device comprising computer-readable program instructions executable by a processor to carry out a method of any one of clauses 49 through 63.

Clause 66—The computer-readable data storage device of clause 65, wherein the computer-readable data storage device is a non-transitory computer-readable data storage device.

Clause 67—A computer data signal embodied in a carrier wave, the computer data signal comprising computer-readable program instructions for performing a method of any one of clauses 49 through 63.

Clause 68—A reproducible computer-readable signal carrying computer-readable program instructions for performing a method of any one of clauses 49 through 63.

Clause 69—A computer software product for performing user verification, the software product comprising instructions, that when executed by a processor of a data processing system will cause the data processing system to carry out the functions of any one clauses 49 through 63.

Clause 70—A smart phone comprising:

a display device configured to display a validation form including a first icon identifying a first type of user-identifier;

a user interface configured to select, from the validation form, the first icon identifying the first type of user-identifier;

a computer-readable data storage configured to record a first image to perform a first user verification;

a network interface configured to transmit, to an application server, the first image to perform the first user verification, and to receive, from the application server, a first notification that indicates the first user verification was successful.

Clause 71—The smart phone of clause 70, further comprising:

a processor, wherein the computer-readable data storage device stores computer-readable program instructions executable by the processor to inactivate the first icon while the validation form is displayed, and wherein the first icon is inactivated in response to recording the first image to perform the first user verification.

Clause 72—The smart phone of any one of clauses 70-71, wherein the validation form further includes at least one additional icon identifying at least one additional type of user-identifier, wherein each additional icon identifies a respective additional type of user-identifier;

wherein the user interface is configured to select, from the validation form, a second icon identifying a second type of user-identifier;

wherein the computer-readable data storage device records a second image to perform the first user verification; and wherein the network interface is configured to transmit, to an application server, the second image to perform the first user verification.

Clause 73—The smart phone of clause 72, further comprising:

a processor, wherein the computer-readable data storage device stores computer-readable program instructions executable by the processor to inactivate the second icon while the validation form is displayed, and wherein the second icon is inactivated in response to recording the second image to perform the first user verification.

Clause 74—The smart phone of clause 72, wherein the user interface is configure to select, from the validation form, a third icon identifying a third type of user-identifier;

wherein the processor executes the program instructions to record, at the data storage device, a third image to perform the first user verification; and wherein the network interface is configure to transmit, to an application server, the third image to perform the first user verification.

Clause 75—The smart phone of clause 74, wherein the program instructions are executable by the processor to inactivate the third icon while the validation form is displayed, and wherein the third icon is inactivated in response to recording the third image to perform the first user verification.

Clause 76—The smart phone of any one of clauses 70-75, wherein the first type of user-identifier is selected from the group consisting of a credit card front side, a credit card back side, a debit card front side, a debit card back side, a driver's license front side, a driver's license back side, a passport, a bill, a mobile phone bill, a utility bill, a statement, a credit card statement, and a bank statement.

Clause 77—The smart phone of any one of clauses 70-76, further comprising:
a processor; and
a computer-readable data storage device storing computer-readable program instructions executable by the processor to create a user profile within the data storage device.

Clause 78—The smart phone of clause 77,
wherein the user profile comprises payment instrument data, and
wherein the first user verification is performed to verify the payment instrument data.

Clause 79—The smart phone of any one of clauses 70-78,
wherein the display device is configured to display an icon selectable to start a user-verification;
wherein the user interface is configured to select the selectable icon associated with user verification, and
wherein selection of the selectable icon associated with user verification triggers displaying the validation form.

Clause 80—The smart phone of clause 79, wherein the displayed icon selectable to start the user-verification comprises a verification icon.

Clause 81—The smart phone of clause 80,
wherein the network interface is configured to receive a second notification that indicates the application server successfully uploaded an image transmitted to the application server for the first user verification.

Clause 82—The smart phone of clause 81,
wherein the network interface is configured to receive a third notification that indicates the application server is awaiting verification of an image transmitted to the application server for the first user verification.

Clause 83—The smart phone of clause 82,
wherein the network interface is configured to receive a fourth notification that indicates the first user verification completed successfully.

Clause 84—The smart phone of clause 83,
wherein the display device is configure to display the fourth notification.

XII. Conclusion

Example embodiments have been described above. Those skilled in the art will understand that changes and modifications can be made to the described embodiments without departing from the true scope and spirit of the present invention, which is defined by the claims.

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device. Any data identified as being stored within a data storage device or transmitted to a device for storage within a data storage device can comprise a computer data signal embodied in a carrier wave.

Moreover, a step or block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting.

The invention claimed is:
1. A method performed by a smartphone, the method comprising:
receiving, at a processor executing a user application program, attributes related to a user account associated with a unique identifier of the smartphone;

transmitting, by a network interface of the smartphone to an application server, the attributes related to the user account associated with the unique identifier of the smartphone;

displaying, by a user interface, a verification form including a first icon and a second icon, wherein the first icon is labelled to identify a first identification document type and corresponds to one or more of the attributes, wherein the second icon is labelled to identify a second identification document type and corresponds to one or more of the attributes, and wherein at least one of the first identification document type or the second identification document type is labelled to identify an identification document type other than a payment instrument;

activating, by the processor, the first icon displayed by the user interface;

after activating the first icon displayed by the user interface, selecting, by the user interface, the first icon in response to a user selecting the first icon from the verification form, and then responsively capturing, by a camera of the smartphone, an image of a first identification document;

automatically deactivating, by the processor, the first icon displayed by the user interface in response to capturing the image of the first identification document;

after deactivating the first icon, displaying, by the user interface, the first icon and the second icon, wherein displaying the first icon after deactivating the first icon includes displaying the first icon as being inactive;

uploading, by the smartphone, the image of the first identification document to the application server;

receiving, at the network interface from the application server, a notification that indicates the attributes related to the user account have been verified; and displaying, by the user interface, an indication that indicates the attributes related to the user account have been verified.

2. The method of claim 1, wherein the first identification document type and the second identification document type are selected from the group consisting of: (i) a credit card, (ii) a debit card, (iii) a government-issued identification document, or (iv) an account statement provided by a provider of goods or services.

3. The method of claim 1, further comprising:
displaying, by the user interface, a third icon while displaying the first icon and the second icon;
wherein the first icon also corresponds to a first side of the first identification document,
wherein the third icon corresponds to a second side of the first identification document, and
wherein capturing the image of the first identification document comprises capturing an image of the first side of the first identification document.

4. The method of claim 1, further comprising:
receiving, from the application server, a second notification, wherein the second notification indicates that the image of the first identification document is awaiting verification; and
based on receiving the second notification, displaying an indication that indicates the image of the first identification document is awaiting verification.

5. The method of claim 1, further comprising:
activating the second icon;
capturing, by the camera of the smartphone while the second icon is active, an image of a second identification document;

in response to capturing the image of the second identification document, deactivating the second icon and displaying, by the user interface, the first icon and the second icon, wherein displaying the first icon and the second icon after deactivating the second icon includes displaying both the first icon and the second icon as being inactive; and uploading the image of the second identification document to the application server, wherein receiving the notification comprises receiving the notification after uploading the image of the second identification document, and wherein displaying the indication comprises displaying the indication after receiving the notification.

6. A non-transitory computer-readable medium storing instructions that, when executed by a processor of a smartphone, cause the smartphone to perform functions comprising:

receiving, at the processor executing a user application program, attributes related to a user account associated with a unique identifier of the smartphone;

transmitting, by a network interface of the smartphone to an application server, the attributes related to the user account associated with the unique identifier of the smartphone;

displaying, by a user interface, a verification form including a first icon and a second icon, wherein the first icon is labelled to identify a first identification document type and corresponds to one or more of the attributes, wherein the second icon is labelled to identify a second identification document type and corresponds to one or more of the attributes; and wherein at least one of the first identification document type or the second identification document type is labelled to identify an identification document type other than a payment instrument;

activating, by the processor, the first icon displayed by the user interface;

after activating the first icon displayed by the user interface, selecting, by the user interface, the first icon in response to a user selecting the first icon from the verification form, and then responsively capturing, by a camera of the smartphone, an image of a first identification document;

automatically deactivating, by the processor, the first icon displayed by the user interface in response to capturing the image of the first identification document;

after deactivating the first icon, displaying, by the user interface, the first icon and the second icon, wherein displaying the first icon after deactivating the first icon includes displaying the first icon as being inactive;

uploading, by the smartphone, the image of the first identification document to the application server;

receiving, at the network interface from the application server, a notification that indicates the attributes related to the user account have been verified; and displaying, by the user interface, an indication that indicates the attributes related to the user account have been verified.

7. The non-transitory computer-readable medium of claim 6, wherein the first identification document type and the second identification document type are selected from the group consisting of: (i) a credit card, (ii) a debit card, (iii) a government-issued identification document, or (iv) an account statement provided by a provider of goods or services.

8. The non-transitory computer-readable medium of claim 6, wherein the functions further comprise:
displaying, by the user interface, a third icon while displaying the first icon and the second icon;
wherein the first icon also corresponds to a first side of the first identification document,
wherein the third icon corresponds to a second side of the first identification document, and
wherein capturing the image of the first identification document comprises capturing an image of the first side of the first identification document.

9. The non-transitory computer-readable medium of claim 6, the functions further comprising:
receiving, from the application server, a second notification, wherein the second notification indicates that the image of the first identification document is awaiting verification; and
based on receiving the second notification, displaying an indication that indicates the image of the first identification document is awaiting verification.

10. The non-transitory computer-readable medium of claim 6, the functions further comprising:
activating the second icon;
capturing, by the camera of the smartphone while the second icon is active, an image of a second identification document;
in response to capturing the image of the second identification document, deactivating the second icon and displaying, by the user interface, the first icon and the second icon, wherein displaying the first icon and the second icon after deactivating the second icon includes displaying both the first icon and the second icon as being inactive; and
uploading the image of the second identification document to the application server,
wherein receiving the notification comprises receiving the notification after uploading the image of the second identification document, and
wherein displaying the indication comprises displaying the indication after receiving the notification.

11. A smartphone comprising:
a processor;
a network interface;
a user interface; and
a non-transitory computer-readable medium storing instructions that, when executed by the processor, cause the smartphone to perform functions comprising:
receiving, at the processor executing a user application program, attributes related to a user account associated with a unique identifier of the smartphone;
transmitting, by the network interface to an application server, the attributes related to the user account associated with the unique identifier of the smartphone;
displaying, by the user interface, a verification form including a first icon and a second icon, wherein the first icon is labelled to identify a first identification document type and corresponds to one or more of the attributes, wherein the second icon is labelled to identify a second identification document type and corresponds to one or more of the attributes, and wherein at least one of the first identification document type or the second identification document type is labelled to identify an identification document type other than a payment instrument;
activating, by the processor, the first icon displayed by the user interface;
after activating the first icon displayed by the user interface, selecting, by the user interface, the first icon in response to a user selecting the first icon from the verification form, and then responsively capturing, by a camera of the smartphone, an image of a first identification document;
automatically deactivating, by the processor, the first icon displayed by the user interface in response to capturing the image of the first identification document;
after deactivating the first icon, displaying, by the user interface, the first icon and the second icon, wherein displaying the first icon after deactivating the first icon includes displaying the first icon as being inactive;
uploading, by the smartphone, the image of the first identification document to the application server;
receiving, at the network interface from the application server, a notification that indicates the attributes related to the user account have been verified; and
displaying, by the user interface, an indication that indicates the attributes related to the user account have been verified.

12. The smartphone of claim 11, wherein the first identification document type and the second identification document type are selected from the group consisting of: (i) a credit card, (ii) a debit card, (iii) a government-issued identification document, or (iv) an account statement provided by a provider of goods or services.

13. The smartphone of claim 11, wherein the functions further comprise:
displaying, by the user interface, a third icon while displaying the first icon and the second icon;
wherein the first icon also corresponds to a first side of the first identification document,
wherein the third icon corresponds to a second side of the first identification document, and
wherein capturing the image of the first identification document comprises capturing an image of the first side of the first identification document.

14. The smartphone of claim 11, the functions further comprising:
receiving, from the application server, a second notification, wherein the second notification indicates that the image of the first identification document is awaiting verification; and
based on receiving the second notification, displaying an indication that indicates the image of the first identification document is awaiting verification.

15. The smartphone of claim 11, the functions further comprising:
activating the second icon;
capturing, by the camera of the smartphone while the second icon is active, an image of a second identification document;
in response to capturing the image of the second identification document, deactivating the second icon and displaying, by the user interface, the first icon and the second icon, wherein displaying the first icon and the second icon after deactivating the second icon includes displaying both the first icon and the second icon as being inactive; and
uploading the image of the second identification document to the application server,
wherein receiving the notification comprises receiving the notification after uploading the image of the second identification document, and wherein displaying the indication comprises displaying the indication after receiving the notification.

16. The method of claim 1, wherein both the first identification document type and the second identification document type are each one from among:
   (i) a credit card or a debit card;
   (ii) a passport or a driver's license; or
   (iii) an account statement provided by a provider of goods or services.

17. The non-transitory computer-readable medium of claim 6, wherein both the first identification document type and the second identification document type are each one from among:
   (i) a credit card or a debit card;
   (ii) a passport or a driver's license; or
   (iii) an account statement provided by a provider of goods or services.

18. The smartphone of claim 11, wherein both the first identification document type and the second identification document type are each one from among:
   (i) a credit card or a debit card;
   (ii) a passport or a driver's license; or
   (iii) an account statement provided by a provider of goods or services.

19. The method of claim 1, further comprising:
activating the second icon;
capturing, by the camera of the smartphone while the second icon is active, an image of a second identification document;
in response to capturing the image of the second identification document, deactivating the second icon and displaying, by the user interface, the first icon and the second icon, wherein displaying the first icon and the second icon after deactivating the second icon includes displaying both the first icon and the second icon as being inactive; and
uploading the image of the second identification document to the application server.

* * * * *